(12) United States Patent
Terasaki

(10) Patent No.: US 8,798,437 B2
(45) Date of Patent: Aug. 5, 2014

(54) MOVING IMAGE PROCESSING APPARATUS, COMPUTER-READABLE MEDIUM STORING THUMBNAIL IMAGE GENERATION PROGRAM, AND THUMBNAIL IMAGE GENERATION METHOD

(75) Inventor: Takashi Terasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 13/356,217

(22) Filed: Jan. 23, 2012

(65) Prior Publication Data

US 2012/0121235 A1    May 17, 2012

Related U.S. Application Data

(63) Continuation of application No. PCT/JP2009/064537, filed on Aug. 20, 2009.

(51) Int. Cl.
*H04N 9/80* (2006.01)

(52) U.S. Cl.
USPC ..................... 386/241; 386/E5.003

(58) Field of Classification Search
USPC ............................................ 386/241, E5.003
See application file for complete search history.

(56) References Cited

U.S. PATENT DOCUMENTS

| | | | | |
|---|---|---|---|---|
| 7,979,879 | B2 * | 7/2011 | Kazama et al. | 725/41 |
| 2008/0260346 | A1 * | 10/2008 | Sukeda et al. | 386/46 |
| 2009/0060468 | A1 * | 3/2009 | Carlberg et al. | 386/124 |
| 2009/0083814 | A1 | 3/2009 | Sekine et al. | |
| 2009/0238543 | A1 * | 9/2009 | Guo | 386/124 |
| 2010/0192106 | A1 * | 7/2010 | Watanabe et al. | 715/838 |

FOREIGN PATENT DOCUMENTS

| | | |
|---|---|---|
| JP | 11-266422 | 9/1999 |
| JP | 2003-32581 | 1/2003 |
| JP | 2004-341940 | 12/2004 |
| JP | 2006-339718 | 12/2006 |
| JP | 2007-74207 | 3/2007 |
| JP | 2007-281945 | 10/2007 |
| JP | 2009-81575 | 4/2009 |
| WO | WO 2008/081514 | 7/2008 |

OTHER PUBLICATIONS

Korean Office Action mailed Mar. 22, 2013 for corresponding Korean Application No. 10-2012-7002673.
Partial English Translation of Japanese Reference No. 2007-74207.
Patent Abstracts of Japan, Publication No. 2006-339718, Published Dec. 14, 2006.

(Continued)

*Primary Examiner* — Thai Tran
*Assistant Examiner* — Nien-Ru Yang
(74) *Attorney, Agent, or Firm* — Staas & Halsey LLP

(57) ABSTRACT

In a moving image processing apparatus, a thumbnail image generation unit acquires moving image data stored in a moving image data storage unit, extracts a thumbnail image from the acquired moving image data based on determination data acquired by a determination data acquisition unit, generates thumbnail image data indicating the extracted thumbnail image, and stores the generated thumbnail image data in a thumbnail image data storage unit. A thumbnail image output unit outputs the thumbnail image data stored in the thumbnail image data storage unit. A determination data acquisition unit acquires determination data for determining a transition of enthusiastic backing of a viewer of a broadcast program during a broadcast time of the broadcast program in which moving image data is broadcast.

10 Claims, 16 Drawing Sheets

(56) References Cited

OTHER PUBLICATIONS

Patent Abstracts of Japan, Publication No. 2007-281945, Published Oct. 25, 2007.
Patent Abstracts of Japan, Publication No. 2003-32581, Published Jan. 31, 2003.
English Abstract of WO 2008/081514, Published Jul. 10, 2008 (included in (AE).
Patent Abstracts of Japan, Publication No. 2004-341940, Published Dec. 2, 2004.
Patent Abstracts of Japan, Publication No. 2007-74207, Published Mar. 22, 2007.
Patent Abstracts of Japan, Publication No. 2009-81575, Published Apr. 16, 2009.
Patent Abstracts of Japan, Publication No. 11-266422, Published Sep. 28, 1999.
International Search Report mailed Nov. 17, 2009 in PCT/JP2009/064537.
Japanese Office Action mailed Apr. 16, 2013 for corresponding Japanese Application No. 2011-527520.

* cited by examiner

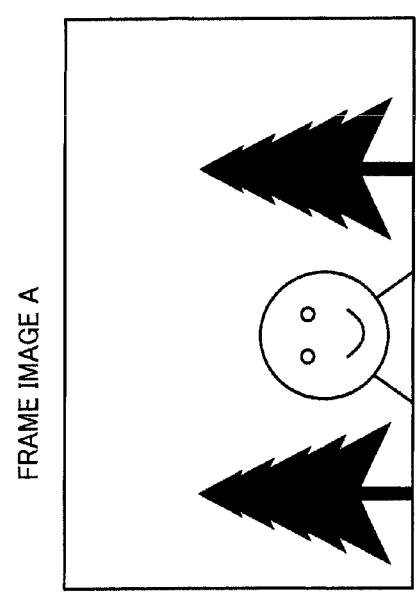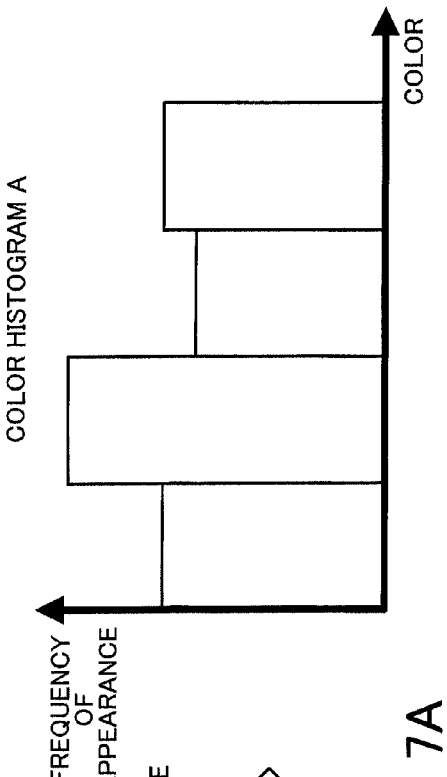
FIG. 7A
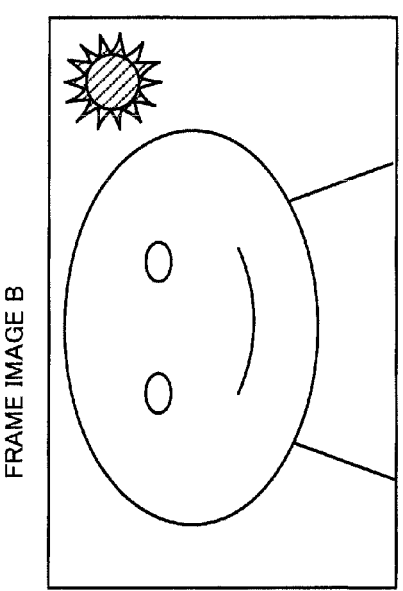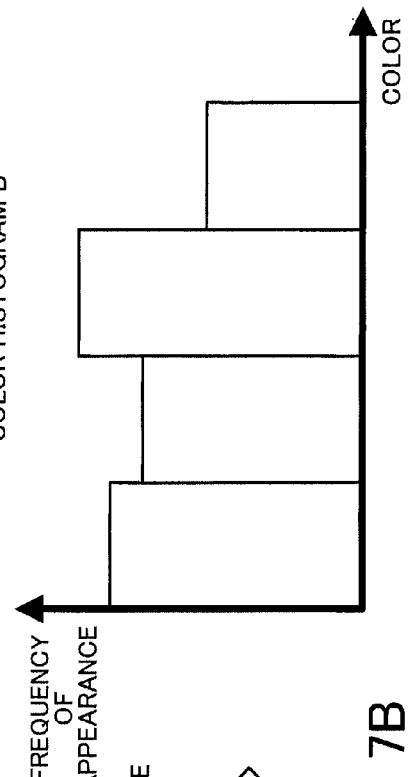
FIG. 7B

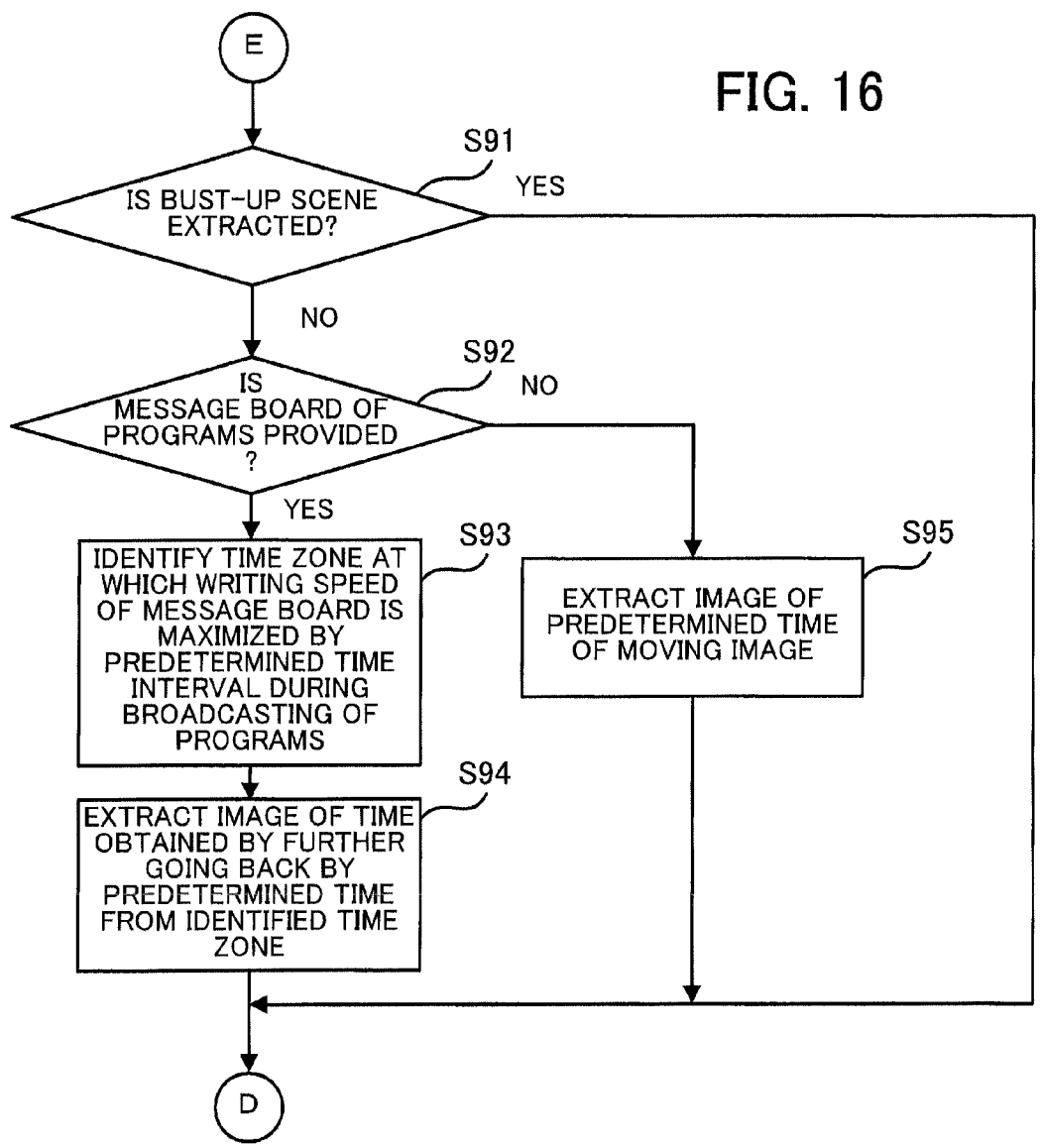

MOVING IMAGE PROCESSING APPARATUS, COMPUTER-READABLE MEDIUM STORING THUMBNAIL IMAGE GENERATION PROGRAM, AND THUMBNAIL IMAGE GENERATION METHOD

This application is a continuing application, filed under 35 U.S.C. §111(a), of International Application PCT/JP2009/064537, filed on Aug. 20, 2009.

FIELD

The embodiment discussed herein is related to a moving image processing apparatus, computer-readable medium storing thumbnail image generation program, and thumbnail image generation method for generating a thumbnail image.

BACKGROUND

In a moving image processing device, conventionally, moving image data of television programs is recorded on a recording medium, and the recorded data is read out and the moving image is reproduced. There is further known a technology in which in order that a user of the moving image processing device may easily recognize contents of moving images of recorded programs, a thumbnail image of static images generated based on the moving images is presented to the user (see, e.g., Japanese Laid-open Patent Publication No. 2006-339718, Japanese Laid-open Patent Publication No. 2007-281945, Japanese Laid-open Patent Publication No. 2003-32581, International Publication Pamphlet No. WO 2008-081514).

In addition, there is known a technology in which a feature amount of both of images is calculated and compared to search similar images (see, e.g., Japanese Laid-open Patent Publication No. 2004-341940).

However, there is a problem that a thumbnail image automatically generated based on moving images does not necessarily indicate contents of programs appropriately. For example, a method for extracting a thumbnail image from a predetermined portion of a moving image is considered by using as a standard a CM (commercial message) as in a technology disclosed in Patent Literature 4. However, a thumbnail image may be extracted without relation to content of a real moving image. As described above, it is difficult to automatically generate a thumbnail image so that a user may grasp contents of a program.

SUMMARY

According to one aspect of the embodiments, a moving image processing apparatus includes: a memory configured to store moving image data; and one or more processors configured to perform a procedure including acquiring determination data for determining a transition of enthusiastic backing of a viewer of a broadcast program during a broadcast time of the broadcast program in which the moving image data is broadcast, acquiring the moving image data stored in the memory, extracting the thumbnail image from the acquired moving image data based on the acquired determination data, generating the thumbnail image data indicating the extracted thumbnail image, and outputting the generated thumbnail image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A and 7B illustrate calculation of an image feature amount in the common section extraction processing according to the second embodiment;

FIG. 16 is a flowchart illustrating a procedure of the thumbnail image generation processing according to the fourth embodiment.

DESCRIPTION OF EMBODIMENTS

Figure 1:
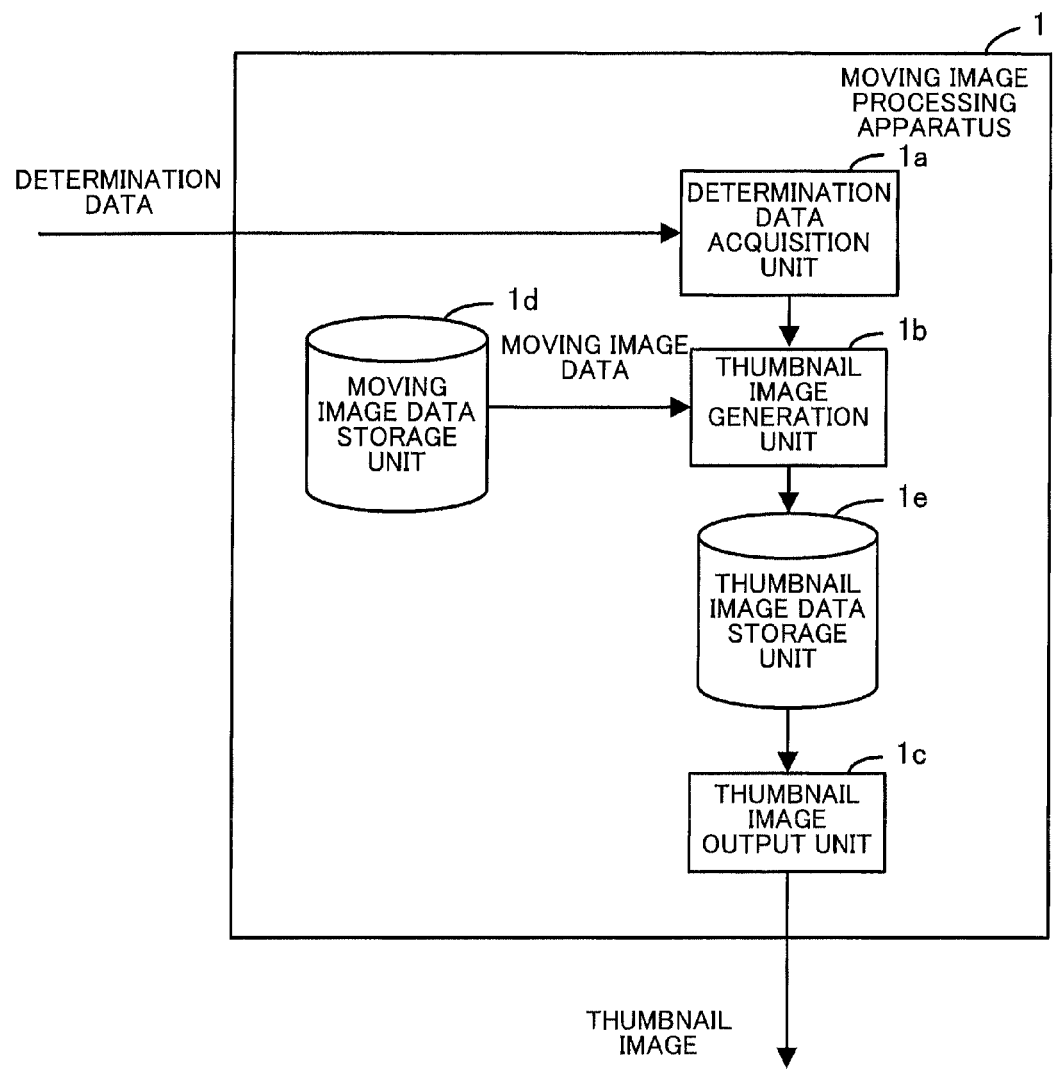
FIG. 1 illustrates a first embodiment.

Several embodiments will be described below with reference to the accompanying drawings, wherein like reference numerals refer to like elements throughout.

First Embodiment

FIG. 1 illustrates a first embodiment. A moving image processing apparatus 1 illustrated in FIG. 1 generates a thumbnail image of a moving image. The moving image processing apparatus 1 includes a determination data acquisition unit 1a, a thumbnail image generation unit 1b, a thumbnail image output unit 1c, a moving image data storage unit 1d, and a thumbnail image data storage unit 1e.

The thumbnail image generation unit 1b acquires moving image data stored in the moving image data storage unit 1d. In the moving image data, the moving image data of a TV program broadcast, for example, through analog broadcasting, digital broadcasting, and Internet broadcasting is recorded along with audio data. Note that in moving image data, a moving image may be recorded independently.

The determination data acquisition unit 1a acquires determination data for determining a transition of enthusiastic backing of viewers during a broadcast time of a broadcast program in which moving image data is broadcast. Here, the enthusiastic backing of the viewers indicates growing interest and concern with respect to moving images of the viewers. The determination data is used for identifying a moving image of a time at which the enthusiastic backing of the viewers is high based on a transition of the enthusiastic backing of the viewers which view a moving image.

The determination data acquisition unit 1a acquires determination data in real time or at the time necessary for generating a thumbnail image, for example, from an external server or a broadcast station via an electric communication line or antenna (not illustrated). Based on the determination data, the determination data acquisition unit 1a identifies a time at which viewers rise based on a transition of the enthusiastic backing of the viewers during the broadcast time of the broadcast program.

Next, the thumbnail image generation unit 1b extracts a thumbnail image from the acquired moving image data based on the determination data acquired by the determination data acquisition unit 1a. In this thumbnail image, an image accurately indicating contents of the moving image data based on the determination data is automatically extracted from the moving image data. This feature of the thumbnail image generation unit 1b extracts a thumbnail image from the moving images identified based on the determination data, of the time at which a viewer rises.

Next, the thumbnail image generation unit 1b generates thumbnail image data indicating the extracted thumbnail image, and stores the generated thumbnail image data in the thumbnail image data storage unit 1e.

The thumbnail image output unit 1c outputs the thumbnail image data stored in the thumbnail image data storage unit 1e. Based on the output of the thumbnail image data, the thumbnail image is displayed to a user, for example, on a monitor (not illustrated) connected to the moving image processing apparatus 1. When viewing the thumbnail image displayed on the monitor, the user grasps contents of the moving image, and further determines whether to view this moving image.

The moving image data storage unit 1d stores moving image data. Note that as the moving image data, the moving image data storage unit 1d may read and acquire that stored in a recording medium.

The thumbnail image data storage unit 1e stores thumbnail image data indicating a thumbnail image of the moving image data.

As a result, when generating a thumbnail image which appropriately indicates contents of moving images, the first embodiment easily evokes the contents of moving images for a user, and further supports determination whether the user views the moving image.

Second Embodiment

Next, a second embodiment will be described.

Figure 2:
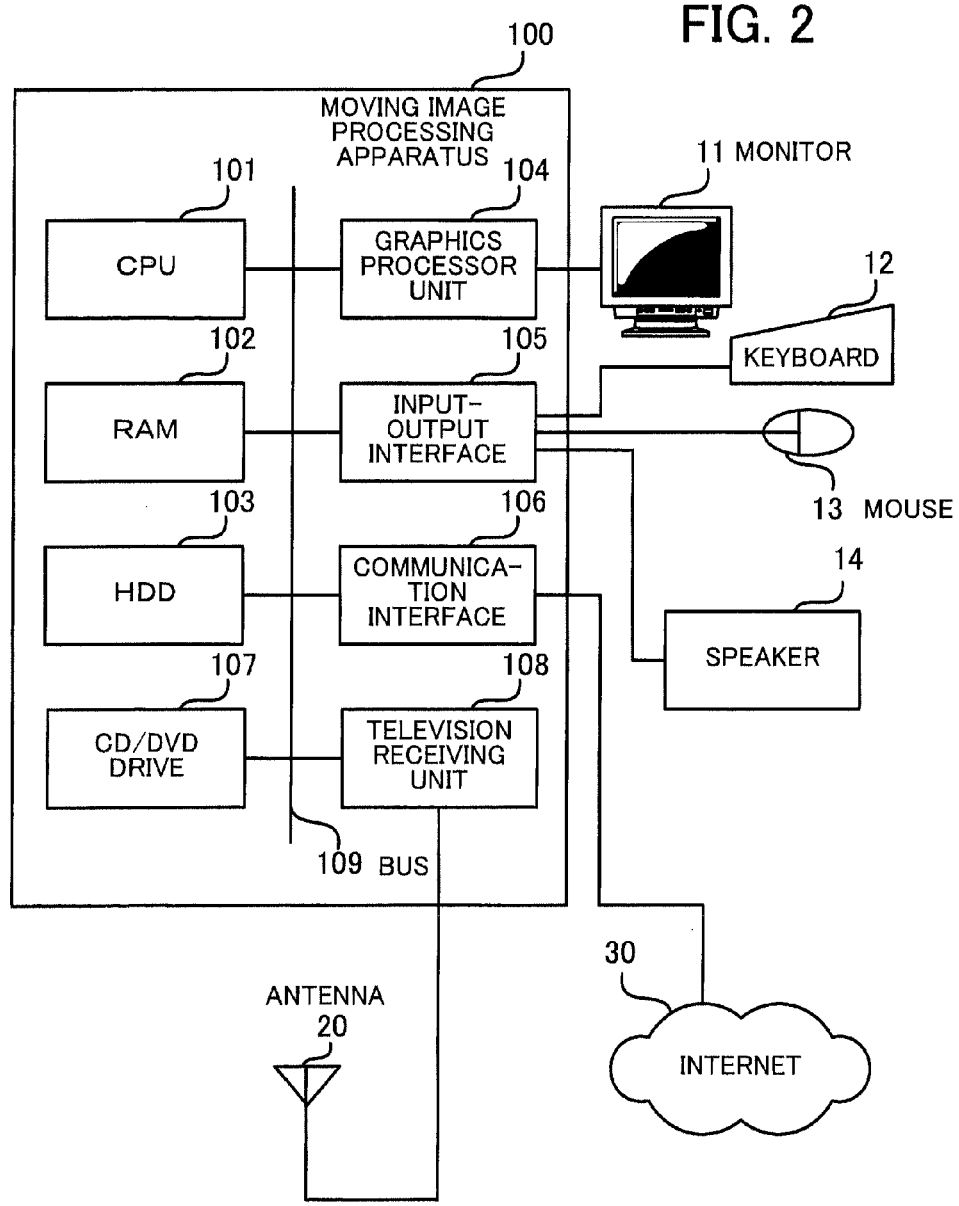
FIG. 2 illustrates a hardware configuration of a moving image processing apparatus according to a second embodiment.

FIG. 2 illustrates a hardware configuration of a moving image processing apparatus according to the second embodiment. In the moving image processing apparatus 100 illustrated in FIG. 2, the entire apparatus is controlled by a CPU (Central Processing Unit) 101. To the CPU 101, via a bus 109, a RAM (Random Access Memory) 102, an HDD (Hard Disk Drive) 103, a graphics processor unit 104, an input-output interface 105, a communication interface 106, a CD/DVD (Compact Disk/Digital Versatile Disk) drive 107, and a television receiving unit 108 are connected.

In the RAM 102, at least a part of an OS (Operating System) or an application program executed by the CPU 101 is temporarily stored. Also, the RAM 202 stores various pieces of data necessary for the CPU 101 to perform processing. The HDD 103 stores programs of the OS and application.

To the graphics processor unit 104, a monitor 11 is connected. In accordance with an instruction from the CPU 101, the graphics processor unit 104 displays an image on the screen of the monitor 11.

To the input-output interface 105, a keyboard 12, a mouse 13, and a speaker 14 are connected. The input-output interface 105 supplies signals, which are produced from the keyboard 12 and the mouse 13, to the CPU 101 via the bus 109 as well as transmits to the speaker 14 an audio signal under the control of the CPU 101 via the bus 109.

The communication interface 106 is connected to a communication line of an Internet 30, a LAN (local area network) (not illustrated), and a cable television (not illustrated). Via communication lines, the communication interface 106 transmits and receives data to and from external devices such as other computers (not illustrated) and network drives (not illustrated). The communication interface 106 further acquires moving image data of an Internet TV program distributed via a communication line.

The CD/DVD drive 107 accesses a magnet-optical disk such as a CD and DVD, and reads and writes moving image data for providing moving images of programs and thumbnail image data generated based on the moving image data.

The television receiving unit 108 has a tuner and a demodulator, and receives airwaves of digital TV broadcasting or analog TV broadcasting received by a connected antenna 20, thereby acquiring moving image data of TV programs.

In the present embodiment, the moving image processing apparatus 100 which records and reproduces moving images of programs is described. As one example, the moving image processing apparatus 100 is used, and further the present embodiment is applicable to a device capable of viewing various pieces of moving image data as in an information processing device such as a small terminal device starting with a mobile phone and a PDA (Personal Digital Assistant), and a terminal device of a personal computer and information processing system.

Through the above-described hardware configuration, a processing function of the present embodiment is realized.

Figure 3:
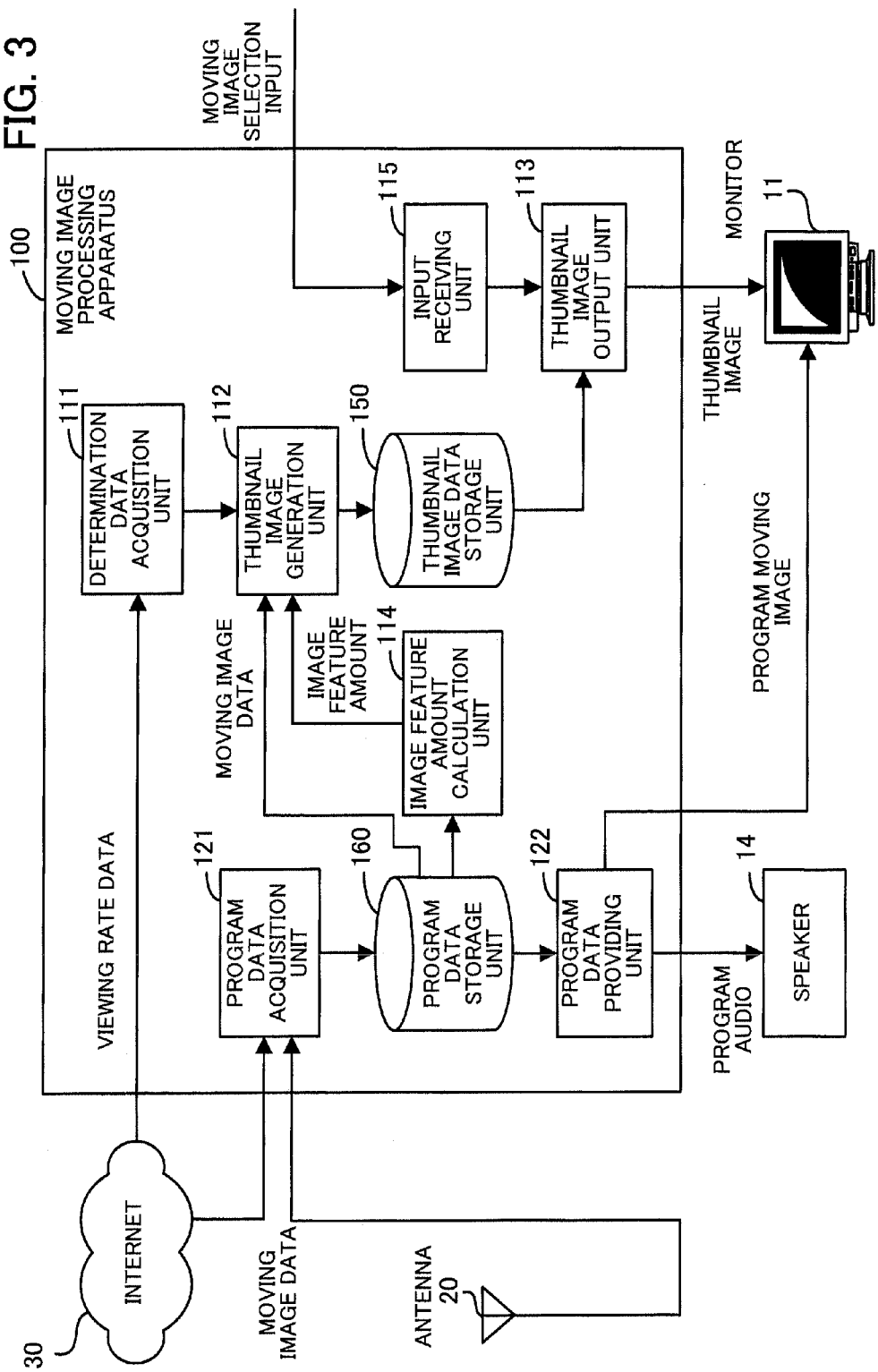
FIG. 3 is a block diagram of the moving image processing apparatus according to the second embodiment.

FIG. 3 is a block diagram of the moving image processing apparatus according to the second embodiment. The moving image processing apparatus 100 illustrated in FIG. 3 includes a determination data acquisition unit 111, a thumbnail image generation unit 112, a thumbnail image output unit 113, an image feature amount calculation unit 114, an input receiving unit 115, a program data acquisition unit 121, a program data providing unit 122, a thumbnail image data storage unit 150, and a program data storage unit 160. To the thumbnail image output unit 113, the monitor 11 is further connected. To the program data acquisition unit 121, the antenna 20 and the Internet 30 are further connected. To the program data providing unit 122, the monitor 11 and the speaker 14 are further connected.

As determination data for determining a transition of enthusiastic backing of viewers during the broadcast time of a broadcast program in which moving image data is broadcast, the determination data acquisition unit 111 acquires viewing rate data indicating a relationship between each time during the broadcast time of the broadcast TV program and a viewing rate of the broadcast TV program via the Internet 30. Here, the enthusiastic backing of the viewers indicates growing interest and concern with respect to moving images of the viewers. The viewing rate data is used for identifying a moving image of the time at which the enthusiastic backing of the viewers is high from a transition of the enthusiastic backing of the viewers which view the moving image.

Here, suppose that this viewing rate data is provided, for example, from a Web site of a TV broadcast station, a rating survey company, and a production/selling source of the moving image processing apparatus 100. The viewing rate data permits the time at which viewers rise to be identified from a transition of the enthusiastic backing of the viewers during the broadcast time of the broadcast program. This viewing rate data functions as determination data.

The thumbnail image generation unit 112 acquires moving image data included in the program data stored in the program data storage unit 160. The program data includes moving image data and audio data of the TV programs broadcast by ground waves, analog broadcasting or digital broadcasting via satellite broadcasting or satellite communication broadcasting received by the antenna 20, and by Internet broadcasting received via the Internet 30. Note that in program data, only a moving image may be independently recorded in a state where audio data is absent.

Next, the thumbnail image generation unit 112 extracts thumbnail images from the acquired moving image data based on the viewing rate data acquired by the determination data acquisition unit 111. The thumbnail image generation unit 112 identifies the time of a high viewing rate based on the viewing rate data, and determines the identified time to be the time at which a viewer of the moving image rises. As can be seen from the above sequence, the thumbnail image generation unit 112 extracts a thumbnail image from the moving images of the time at which the viewer rises, identified based on the viewing rate data.

At this time, in the case where the moving image data of previous broadcasting is stored in the program data storage unit 160, the thumbnail image generation unit 112 extracts a common section in which an image is the same as or similar to that of the moving image data of the previous broadcasting based on the image feature amount calculated by the image feature amount calculation unit 114. The thumbnail image generation unit 112 further extracts a bust-up image including a character's bust up from the moving image data of the extracted common section, and then generates thumbnail image data by using as a thumbnail image the extracted bust-up image.

The thumbnail image generation unit 112 further extracts a highest viewing rate image being an image of the time at which a viewing rate is maximized from the acquired moving image data based on the viewing rate data, and then generates thumbnail image data by using as a thumbnail image the extracted highest viewing rate image.

In addition, the thumbnail image generation unit 112 may further extract a viewing rate rapidly rising image being an image of the time at which a viewing rate rapidly rises from the acquired moving image data based on the viewing rate data, and then generate thumbnail image data by using as a thumbnail image the extracted viewing rate rapidly rising image. Here, suppose, for example, that the rapidly rising of the viewing rate is that a viewing rate rises by a slope equal to or more than a predetermined slope per unit of time.

Next, the thumbnail image generation unit 112 stores the generated thumbnail image data in the thumbnail image data storage unit 150.

The thumbnail image output unit 113 outputs the thumbnail image data stored in the thumbnail image data storage unit 150. Based on the output of the thumbnail image data, the thumbnail image is displayed to a user on the monitor 11 connected to the moving image processing apparatus 100. When viewing the thumbnail image displayed on the monitor 11, the user grasps contents of the moving image and further determines whether to view the moving image.

The image feature amount calculation unit 114 calculates an image feature amount of an image of a frame of the moving image data and that of the previous broadcasting.

The input receiving unit 115 receives a selection input of moving images of a program to be viewed through the user. In the case of inputting a program to be selected, the user uses, for example, the keyboard 12 (described above in FIG. 2), the mouse 13 (described above in FIG. 2), a button (not illustrated), and a touch panel (not illustrated) as the input receiving unit 115.

At this time, the user operates the input receiving unit 115, and receives an offer of thumbnail images of viewable programs. At this time, the moving image processing apparatus 100 permits the thumbnail image to be displayed on the monitor 11.

The program data acquisition unit 121 acquires program data (moving image data and audio data) of a TV program available to the user, and stores the acquired program data in the program data storage unit 160. The communication interface 106, CD/DVD drive 107, and television receiving unit 108 described above in FIG. 2 function as the program data acquisition unit 121.

The program data providing unit 122 provides program data received by the input receiving unit 115 and selected by the user. The program data providing unit 122 outputs content data stored in the program data storage unit 160. This processing permits the user to view the program in which a thumbnail image is recognized.

The program data providing unit 122 supplies, as a signal, content to the monitor 11 and speaker 14 connected to the moving image processing apparatus 100, and allows the user to view the content via those devices. However, it is not limited thereto and, provided that the moving image processing apparatus 100 has a display unit (not illustrated) and an audio output unit (not illustrated), the program data providing unit 122 may directly output the content through those devices and allow the user to view it.

The thumbnail image data storage unit 150 stores the thumbnail image data indicating a thumbnail image of the moving image data.

The program data storage unit 160 stores program data of the previously-broadcast TV program acquired by the program data acquisition unit 121. In addition to reception of the above-described broadcasting, the program data stored in a recording medium such as a DVD and a CD-ROM may be read and acquired.

The program data storage unit 160 may have a mass-storage device such as the above-described HDD 103 of FIG. 2, and store the program data therein. The program data storage unit 160 may further store the program data in all kinds of storage devices such as an external storage device of a network drive (not illustrated) connected to the moving image processing apparatus 100 and a removable disk as in the above-described CD/DVD drive 107 of FIG. 2.

In the present embodiment, a thumbnail image may be extracted from other parts except a commercial message included in the program data. Further, in the present embodiment, a commercial message may be previously excluded from objects for extracting thumbnail images.

Next, processing to be performed in the present embodiment will be described.

Figure 4:
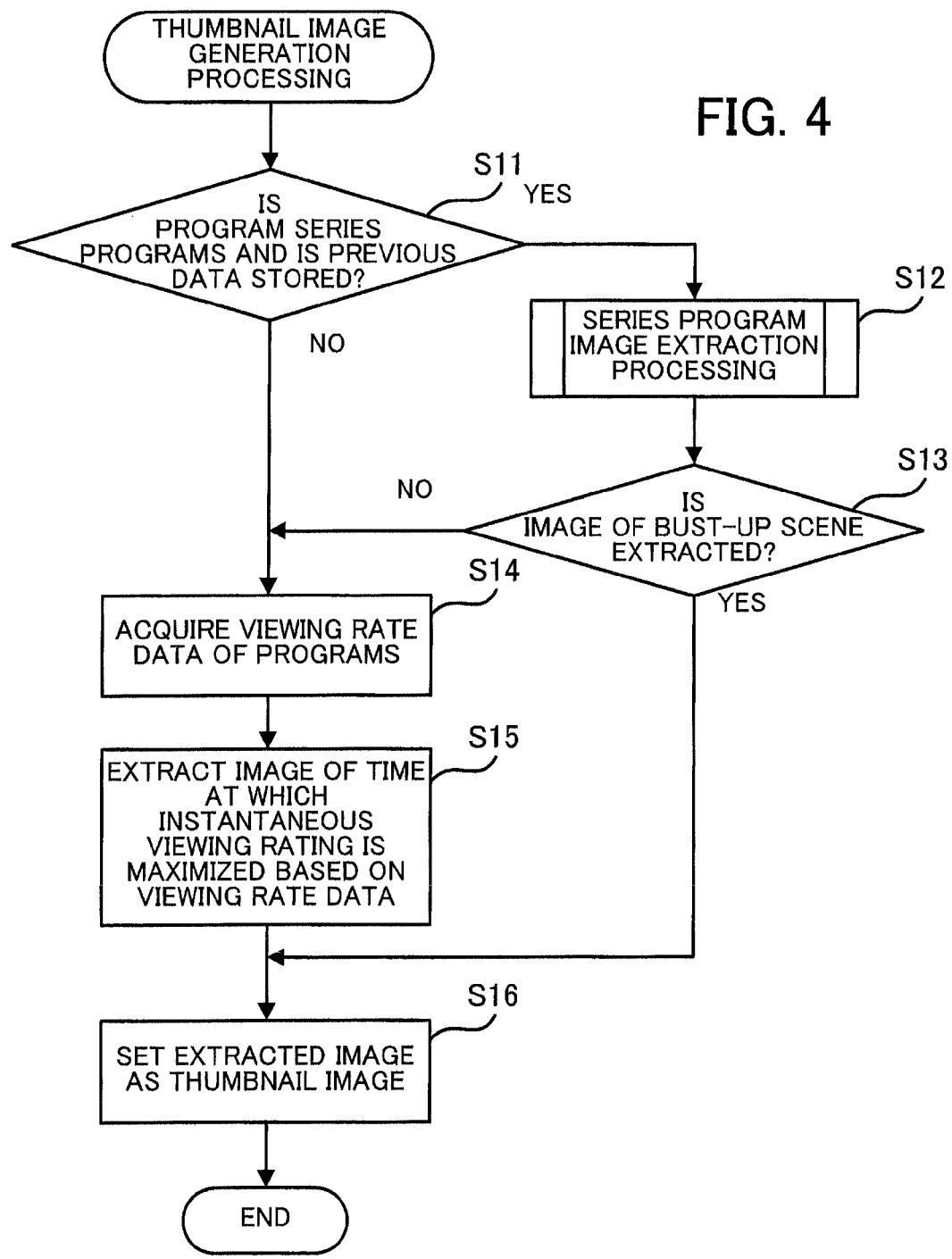
FIG. 4 is a flowchart illustrating a procedure of thumbnail image generation processing according to the second embodiment.

FIG. 4 is a flowchart illustrating a procedure of the thumbnail image generation processing according to the second embodiment. In the thumbnail image generation processing illustrated in FIG. 4, the moving image processing apparatus 100 (described above in FIG. 2) generates thumbnail images of the TV program based on the moving image data of the TV program. The thumbnail image generation processing is performed, for example, during storing (recording) the TV program.

(Step S11) The thumbnail image generation unit 112 (described above in FIG. 3) determines whether a program in which a thumbnail image is generated through the thumbnail image generation processing is a series of programs and the moving image data of the previous broadcasting is stored in the program data storage unit 160. If so, the process advances to step S12. On the other hand, if not, the process proceeds to step S14.

(Step S12) The thumbnail image generation unit 112 performs series program image extraction processing (described later in FIG. 5) with respect to the moving image data of the program in which it is determined at step S11 that the moving image data of the previous broadcasting is stored.

(Step S13) The thumbnail image generation unit 112 determines whether an image of a bust-up scene is extracted in the series program image extraction processing of step S12. If so, the process advances to step S16. On the other hand, if not, the process proceeds to step S14.

(Step S14) The determination data acquisition unit 111 (described above in FIG. 3) acquires a viewing rate data indicating a transition of a viewing rate of the program via the Internet 30 (described above in FIG. 2).

(Step S15) From the moving image data of programs based on the viewing rate data acquired at step S14, the thumbnail image generation unit 112 extracts as a highest viewing rate image an image of the time at which an instantaneous viewing rating is maximized during the broadcast of the programs.

(Step S16) The thumbnail image generation unit 112 sets an image of the TV program extracted at step S13 or S15 as a thumbnail image of the program, and stores the thumbnail image data in the thumbnail image data storage unit 150 (described above in FIG. 3). The process is then finished.

In the case where moving images are used in the series programs, the present embodiment extracts the thumbnail image of a bust-up scene from a common section. Specifically, the thumbnail image from the common section and the thumbnail image of a bust-up scene are extracted in preference to the thumbnail image based on the viewing rate data. However, the extraction method is not limited thereto, and the thumbnail image based on the viewing rate data may be extracted in preference to the other extraction methods. In addition, the thumbnail image of a bust-up scene may be extracted not only from the common section but also from the other section.

Figure 5:
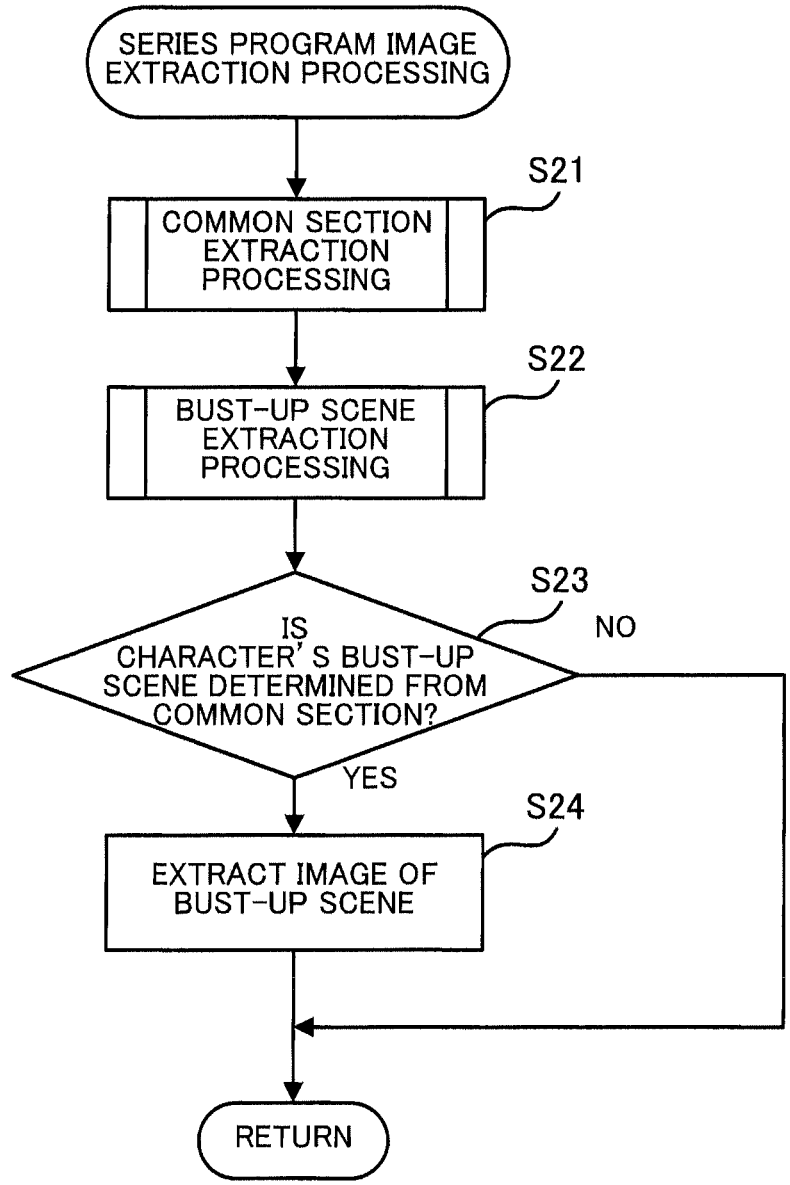
FIG. 5 is a flowchart illustrating a procedure of series program image extraction processing according to the second embodiment.

FIG. 5 is a flowchart illustrating a procedure of the series program image extraction processing according to the second embodiment. In the series program image extraction processing illustrated in FIG. 5, the moving image processing apparatus 100 (described above in FIG. 2) extracts the common section of the program which is a series of programs and whose moving image data of the previous broadcasting is stored, and extracts the image of a bust-up scene. In the series program image extraction processing, the performance is started by calling of the thumbnail image generation processing (described above in FIG. 4).

(Step S21) The thumbnail image generation unit 112 (described above in FIG. 3) performs the common section extraction processing (described later in FIG. 6) with respect to the moving image data of the program in which a thumbnail image is generated and the moving image data of the program of the previous broadcasting.

(Step S22) The thumbnail image generation unit 112 performs bust-up scene extraction processing (described later in FIG. 8) in the common section extracted at step S21.

(Step S23) The thumbnail image generation unit 112 determines whether the bust-up scene is determined based on the common section at step S22. If so, the process advances to step S24. On the other hand, if not, the process returns to the thumbnail image generation processing.

(Step S24) The thumbnail image generation unit 112 extracts an image of the bust-up scene determined at step S22. The process then returns to the thumbnail image generation processing.

When a bust-up image is extracted as a thumbnail image, the present embodiment extracts it from the common section. However, it is not limited thereto, and the present embodiment may extract the bust-up image from all the moving images without extracting the common section.

Figure 6:
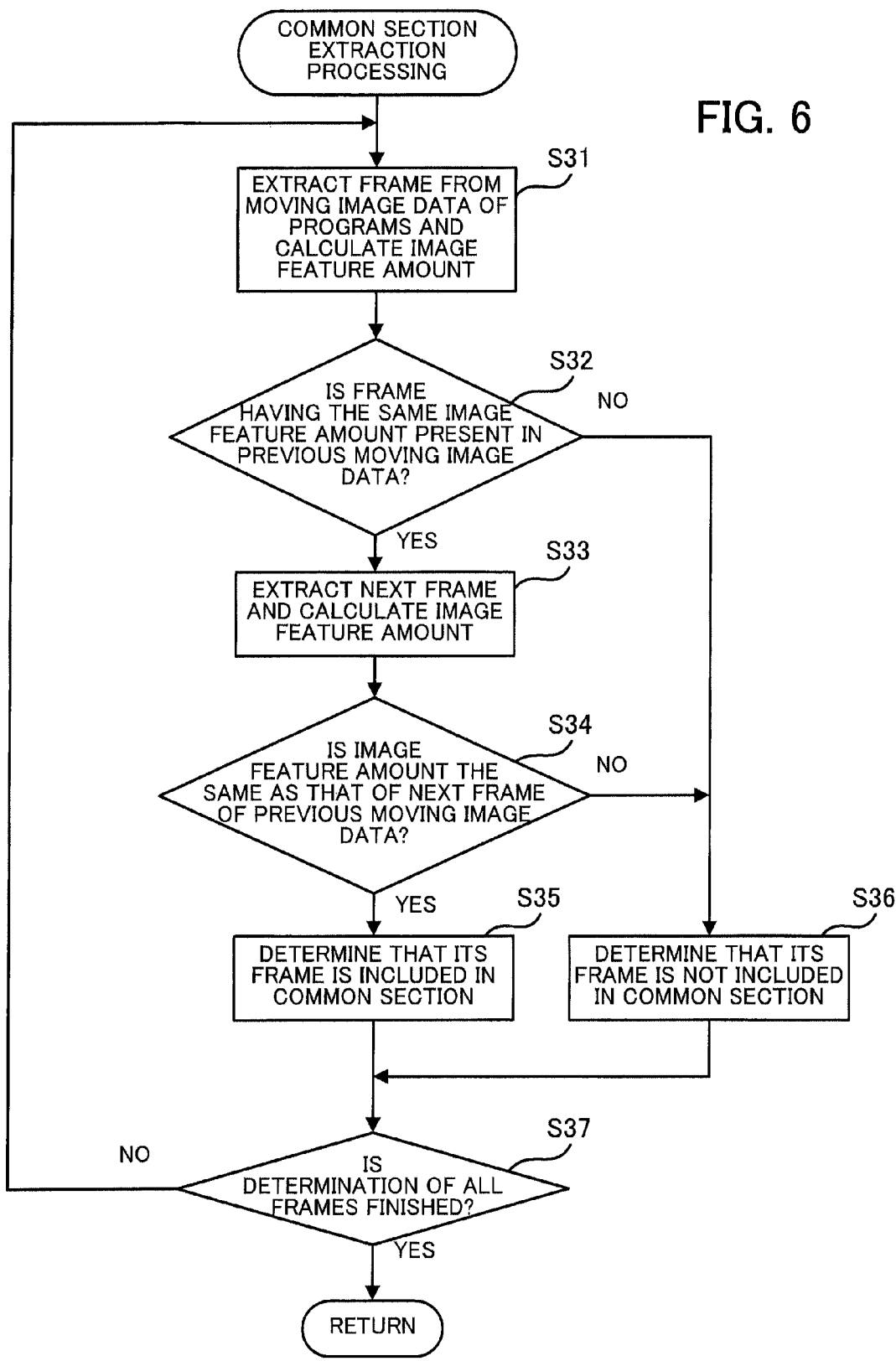
FIG. 6 is a flowchart illustrating a procedure of common section extraction processing according to the second embodiment.

FIG. 6 is a flowchart illustrating a procedure of the common section extraction processing according to the second embodiment. In the common section extraction processing illustrated in FIG. 6, the moving image processing apparatus 100 (described above in FIG. 2) extracts the common section from the moving image data of the program in which a thumbnail image is generated and the stored moving image data of the program of the previous broadcasting. In the common section extraction processing, the performance is started by calling of the series program image extraction processing (described above in FIG. 5).

Here, in the common section extraction processing, the image feature amount is calculated in each frame with respect to the moving image data of the program in which a thumbnail image is generated. A process of comparing the above image feature amount with that of a frame of a moving image of the program of the previous broadcasting is repeated.

(Step S31) The image feature amount calculation unit 114 (described above in FIG. 3) acquires the moving image data of a program in which a thumbnail image is generated from the program data storage unit 160 (described above in FIG. 3) and extracts a frame from the acquired moving image data, thus calculating the image feature amount. Note that the image feature amount is calculated from a head frame of the moving image data. Then, every time the above step S31 is repeated, the image feature amount of a next frame, namely, that of a frame after the elapse of a predetermined time is calculated.

(Step S32) The thumbnail image generation unit 112 (described above in FIG. 3) compares the image feature amount of a frame calculated at step S31 in the moving image data of the program in which a thumbnail image is generated with the image feature amount of each frame in the moving image data of the program of the previous broadcasting. The thumbnail image generation unit 112 further determines whether a frame having the same image feature amount as that of the frame calculated in step S31 is present in the previous moving image data. If so, the process advances to step S33. On the other hand, if not, the process proceeds to step S36. Note that in the comparison of the image feature amount, even if both of the image feature amount are not completely matched with each other, if they are approximated to each other in the predetermined range, the thumbnail image generation unit 112 may determine that they are the same as each other.

(Step S33) The image feature amount calculation unit 114 acquires from the program data storage unit 160 the moving image data of the program in which a thumbnail image is generated. The image feature amount calculation unit 114 further extracts from the acquired moving image data a next frame of the frame acquired at step S31, namely, a frame after the elapse of a predetermined time, thus calculating the image feature amount.

(Step S34) The thumbnail image generation unit 112 determines whether the image feature amount calculated at step S33 is the same as that of a next frame of a frame in the moving image data of the previous broadcasting compared at step S32. If so, the process advances to step S35. On the other hand, if not, the process proceeds to step S36.

(Step S35) The thumbnail image generation unit 112 determines that the frame extracted at step S31 is included in the common section.

(Step S36) The thumbnail image generation unit 112 determines that the frame extracted at step S31 is not included in the common section.

(Step S37) The thumbnail image generation unit 112 determines whether the determination whether all the frames of the moving image data of the program in which a thumbnail image is generated are included in the common section is finished. If not, the process advances to step S31 and the process is repeated with respect to the next frame. On the other hand, if so, the process returns to the series program image extraction processing.

Here, calculation of the image feature amount in the common section extraction processing illustrated in FIG. 6 will be described.

FIGS. 7A and 7B illustrate the calculation of the image feature amount in the common section extraction processing according to the second embodiment. FIG. 7A illustrates a frame image A being an image of the frame extracted from the moving image data and a color histogram A being one example of the image feature amount calculated from the frame image A. FIG. 7B illustrates a frame image B being an image of a frame different from the frame image A and a color histogram B being one example of the image feature amount calculated from the frame image B.

In the common section extraction processing according to the present embodiment, for the purpose of extracting the common sections of both the moving images, the thumbnail image generation unit 112 compares whether both of the frames included in the moving images are the same as each other. When both of the image feature amount indicating features of the images of the frames are compared, the comparison of both the frames is performed. As the image feature amount, for example, a color histogram is used.

In the color histogram, for example, with respect to a color space represented by RGB (red, green, and blue), the number of pixels belonging to each subspace of a color space sectioned in an appropriate range is counted and a value obtained by the count is represented by a vector format.

In the present embodiment, when comparing both of the thus calculated image feature amount, the thumbnail image generation unit 112 determines whether the frames are the same as each other and extracts the common sections of both of the moving images.

Suppose, for example, that when comparing the image feature amount of the frame image A illustrated in FIG. 7A with that of the frame image B illustrated in FIG. 7B, the thumbnail image generation unit 112 determines whether the frame image A is the same as the frame image B. In this case, as illustrated in FIG. 7A, the image feature amount calculation unit 114 counts frequency of appearance of a color in each dot of the frame image A and creates the color histogram A indicating the image feature amount of the frame image A. Next, in the same manner, as illustrated in FIG. 7B, the image feature amount calculation unit 114 counts frequency of appearance of a color in each dot of the frame image B and creates the color histogram B indicating the image feature amount of the frame image B. When comparing the color histograms A and B, the thumbnail image generation unit 112 determines whether the frame image A is the same as the frame image B.

Figure 8:
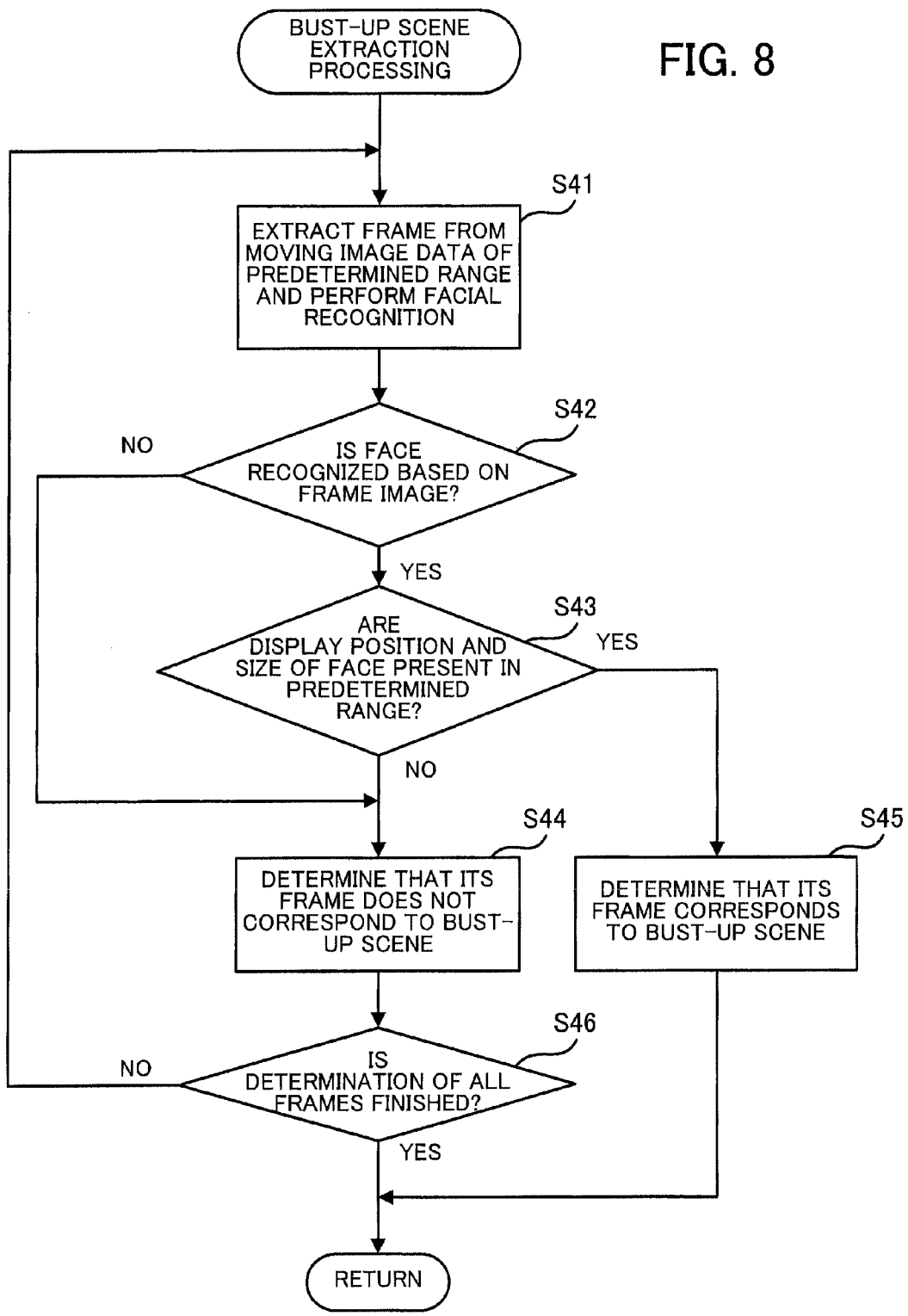
FIG. 8 is a flowchart illustrating a procedure of bust-up scene extraction processing according to the second embodiment.

FIG. 8 is a flowchart illustrating a procedure of the bust-up scene extraction processing according to the second embodiment. In the bust-up scene extraction processing illustrated in FIG. 8, the moving image processing apparatus 100 (described above in FIG. 2) determines, based on the moving image in the predetermined range, the bust-up scene on which a character's bust up is reflected. In the bust-up scene extraction processing, the performance is started by calling of the series program image extraction processing (described above in FIG. 5).

(Step S41) The thumbnail image generation unit 112 (described above in FIG. 3) extracts a frame from the moving image data in the predetermined range, thus performing facial recognition. Note that the facial recognition is started from the head frame of the moving image data in the predetermined range. Specifically, when the bust-up scene extraction processing is called by the above-described series program image extraction processing of FIG. 5, the facial recognition is performed in turn from the head frame in the common section extracted by the above-described common section extraction processing of FIG. 6. In addition, when the series program image extraction processing is called by the aftermentioned thumbnail image generation processing of FIG. 11, 12, or 14, the facial recognition is performed in turn from the head frame with respect to the moving image in which a thumbnail image is generated. Every time the above step S41 is repeated, the facial recognition of a next frame, namely, that of a frame after the elapse of a predetermined time is performed in turn.

(Step S42) The thumbnail image generation unit 112 determines as a result of the facial recognition performed at step S41 whether a character's face is recognized based on an image of the frame. If so, the process advances to step S43. On the other hand, if not, the process proceeds to step S44.

(Step S43) The thumbnail image generation unit 112 determines whether a display position and size of the face recognized in the frame in which the facial recognition is performed at step S41 are present in a predetermined range. If so, the process advances to step S45. On the other hand, if not, the process proceeds to step S44. Here, as a criterion of judgment whether a display position and size of a face are present in the predetermined range, for example, central coordinates of the face are supposed to be located in an upper half of a screen and a major axis of the face is supposed to be one third or more of a length in the longitudinal direction of the screen. In this case, there are arbitrarily set conditions that a frame corresponds to a bust-up scene when the conditions are satisfied.

(Step S44) The thumbnail image generation unit 112 determines that the frame in which the facial recognition is performed at step S41 does not correspond to a bust-up scene.

(Step S45) The thumbnail image generation unit 112 determines that the frame in which the facial recognition is performed at step S41 corresponds to a bust-up scene. The process then returns to the series program image extraction processing.

(Step S46) The thumbnail image generation unit 112 determines whether the determination is finished with respect to all frames of the moving image data in the predetermined range. If not, the process advances to step S41. On the other hand, if so, the process returns to the series program image extraction processing.

Next, a display screen displayed in the present embodiment will be described.

Figure 9:
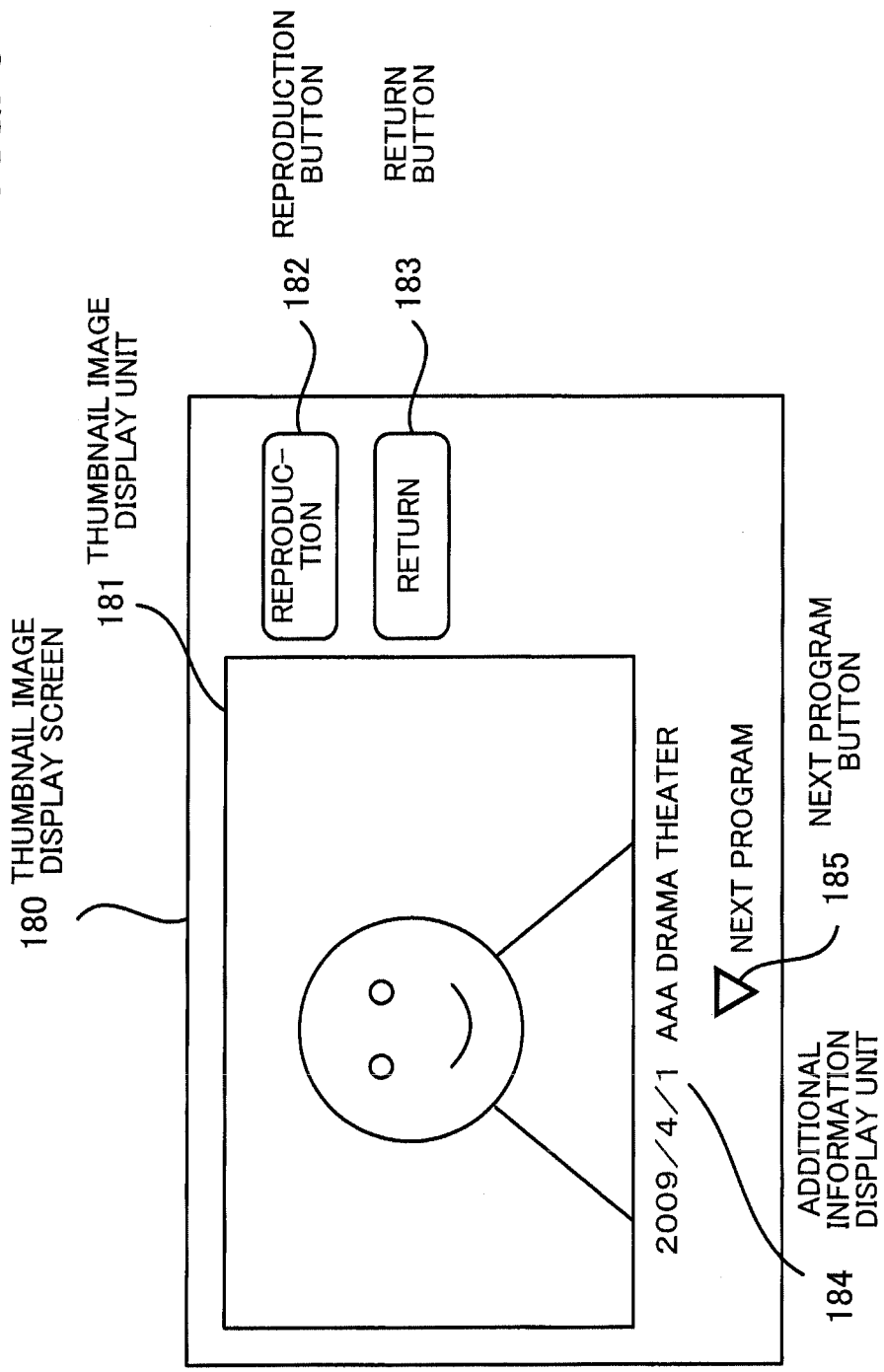
FIG. 9 illustrates a thumbnail image display screen according to the second embodiment.

FIG. 9 illustrates a thumbnail image display screen according to the second embodiment. The thumbnail image display screen 180 illustrated in FIG. 9 is a screen displayed on the monitor 11 connected to the moving image processing apparatus 100, and one example of a thumbnail image display screen displaying the thumbnail image generated by the moving image processing apparatus 100.

On the thumbnail image display screen 180, a thumbnail image display unit 181 being a part having displayed thereon a thumbnail image, a reproduction button 182 for reproducing a program having displayed therein a thumbnail image by an operation, a return button 183 for stopping a display of the thumbnail image display screen 180 by an operation, an additional information display unit 184 for displaying additional information indicating a title and video-recording date of a program having displayed therein a thumbnail image, and a next program button 185 for displaying a thumbnail image of the next program by an operation are provided.

Through the thumbnail image display screen 180, when viewing a thumbnail image of a program, a user easily confirms, imagines, and remembers contents of the program. When operating the thumbnail image display screen 180, the user performs an operation for the reproduction, stops the display of the thumbnail image, and displays thumbnail images of other programs with respect to the program in which a thumbnail image is confirmed.

When the user extracts a thumbnail image based on the viewing rate data, a thumbnail image from the common section, and a thumbnail image from the bust-up scene, respective extraction methods may be independently used, or a part of the extraction methods may be used in combination. The extraction methods may be further used in combination of other extraction methods of thumbnail images. Note that a combination of the extraction methods is not limited to the above combination and may be appropriately changed.

As described above, according to the second embodiment, when generating a thumbnail image in which contents of the program are more appropriately indicated, the proposed moving image processing apparatus easily evokes them for a user and supports a determination whether the user views moving images of the program.

When a bust-up image is applied to a thumbnail image, these features of the second embodiment permit characters of the program to be definitely displayed and the user to easily grasp contents of the program.

In addition, when a thumbnail image is extracted from a common part of the program of previous broadcasting, these features of the second embodiment permit the user to easily understand that the program using a thumbnail image is a series of programs.

When a thumbnail image is extracted based on the viewing rate of programs, the second embodiment reflects enthusiastic backing of viewers in each scene of a program during broadcasting on the extraction of the thumbnail image.

When an image of the time of the highest viewing rate or the time at which a viewing rate rapidly rises is extracted as a thumbnail image, a scene considered that the viewer most rises in the program is set as a thumbnail image. Therefore, the viewer easily grasps contents of the program. Further, since there is a high probability that a scene is impressive in a program, these features of the second embodiment permit the user to easily remember contents of the program.

Third Embodiment

Next, a third embodiment will be described. A difference from the second embodiment will be mainly described. In the third embodiment, the same circuit elements as those in the second embodiment are indicated by the same reference numerals as in the second embodiment, and the description will not be repeated here.

The third embodiment has a function of extracting as a thumbnail image an image of a time zone of a maximum speed in which a posting to a message board relating to the program is written during broadcasting, and differs from the second embodiment in the above-described function.

Figure 10:
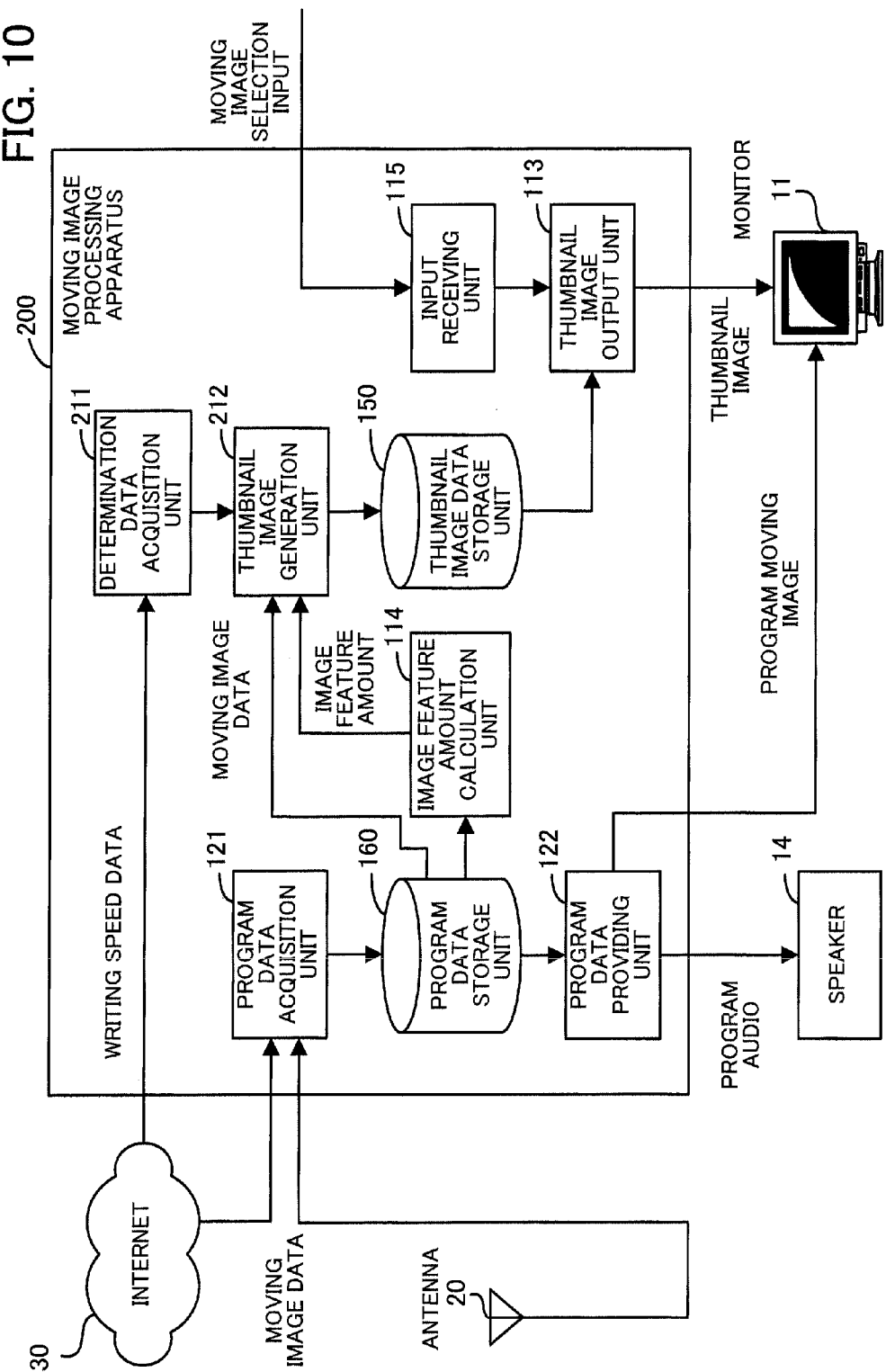
FIG. 10 is a block diagram of a moving image processing apparatus according to a third embodiment.

FIG. 10 is a block diagram of a moving image processing apparatus according to the third embodiment. The moving image processing apparatus 200 illustrated in FIG. 10 includes a determination data acquisition unit 211, a thumbnail image generation unit 212, the thumbnail image output unit 113, the image feature amount calculation unit 114, the input receiving unit 115, the program data acquisition unit 121, the program data providing unit 122, the thumbnail image data storage unit 150, and the program data storage unit 160. To the thumbnail image output unit 113, the monitor 11 is further connected in the same manner as in the second embodiment. To the program data acquisition unit 121, the antenna 20 and the Internet 30 are further connected in the same manner as in the second embodiment. To the program data providing unit 122, the monitor 11 and the speaker 14 are further connected in the same manner as in the second embodiment.

As determination data for determining a transition of enthusiastic backing of viewers during the broadcast time of a broadcast program in which moving image data is broadcast, the determination data acquisition unit 211 acquires writing speed data indicating a relationship between each time of the broadcast programs during the broadcast time and a writing speed of posting of the viewers to a message board relating to the broadcast program via the Internet 30. Here, the enthusiastic backing of the viewers indicates growing interest and concern with respect to moving images of the viewers. The writing speed data is used for identifying moving images of the time at which the enthusiastic backing of the viewers is high from a transition of the enthusiastic backing of the viewers which view moving images.

Here, a message board as a measurement object of the writing speed data is supposed to be provided, for example, from a Web site of a TV broadcast station and a production/selling source of the moving image processing apparatus 200. The writing speed data permits the time at which the viewers rise to be identified from the transition of the enthusiastic backing of the viewers during the broadcast time of the broadcast program. This writing speed data functions as determination data.

In the writing speed data, a response of a viewer to a program may be posted. At the same time, when the writing speed is acquired, the writing speed data may be provided not only by a moving image provider such as a broadcast station but also by a third party. In addition, when a Web site receives a posting from a viewer to a program, a message board is not necessarily used and, for example, a comment field of a Weblog may be used.

For example, the writing speed data may be set so as to indicate the number of postings to a message board for a given length of time. The writing speed data may be further set so as to indicate the amount of data representing contents posted to the message board for a given length of time.

In the writing speed data, data indicating contents of a message board or data indicating the presence or absence of an update of the message board may be used as the writing speed data. In this case, the determination data acquisition unit 211 may acquire the writing speed data from the message board via the Internet 30. Based on the presence or absence of the update of the message board indicated by the acquired writing speed data, the determination data acquisition unit 211 may further calculate a writing speed in each time during the broadcasting.

The thumbnail image generation unit 212 acquires moving image data included in program data stored in the program data storage unit 160.

Next, based on the writing speed data acquired by the determination data acquisition unit 211, the thumbnail image generation unit 212 extracts a thumbnail image from the acquired moving image data. Based on the writing speed data, the thumbnail image generation unit 212 identifies the time at which the writing speed of a viewer to the message board is fast, and determines the identified time as the time at which the viewer of the moving image rises. As can be seen from the above discussion, the thumbnail image generation unit 212 permits a thumbnail image to be extracted from the moving images of the time at which the viewer identified from the writing speed data rises.

At this time, in the case where the moving image data of previous broadcasting is stored in the program data storage unit 160, the thumbnail image generation unit 212 extracts a common section in which an image is the same as or similar to that of the moving image data of the previous broadcasting based on the image feature amount calculated by the image feature amount calculation unit 114. The thumbnail image generation unit 212 further extracts a bust-up image including a character's bust up from the moving image data of the extracted common section, and then generates thumbnail image data by using as a thumbnail image the extracted bust-up image.

Based on the writing speed data, the thumbnail image generation unit 212 extracts from the acquired moving image data a high-speed writing image being an image of a time zone at which the writing speed is a predetermined speed or more. The thumbnail image generation unit 212 then generates thumbnail image data by using as a thumbnail image the extracted high-speed writing image.

Next, the thumbnail image generation unit 212 stores the generated thumbnail image data in the thumbnail image data storage unit 150.

The thumbnail image output unit 113 outputs the thumbnail image data stored in the thumbnail image data storage unit 150 in the same manner as in the second embodiment.

The image feature amount calculation unit 114 calculates an image feature amount of an image of a frame of the moving image data and that of the previous broadcasting in the same manner as in the second embodiment.

The input receiving unit 115 receives a selection input of moving images of a program to be viewed through the user in the same manner as in the second embodiment.

The program data acquisition unit 121 acquires program data of the TV program available to the user, and stores the acquired program data in the program data storage unit 160 in the same manner as in the second embodiment.

The program data providing unit 122 provides program data selected by the user received by the input receiving unit 115 in the same manner as in the second embodiment.

The thumbnail image data storage unit 150 stores the thumbnail image data indicating a thumbnail image of the moving image data in the same manner as in the second embodiment.

The program data storage unit 160 stores program data of the previously broadcast TV program acquired by the program data acquisition unit 121 in the same manner as in the second embodiment.

Figure 11:
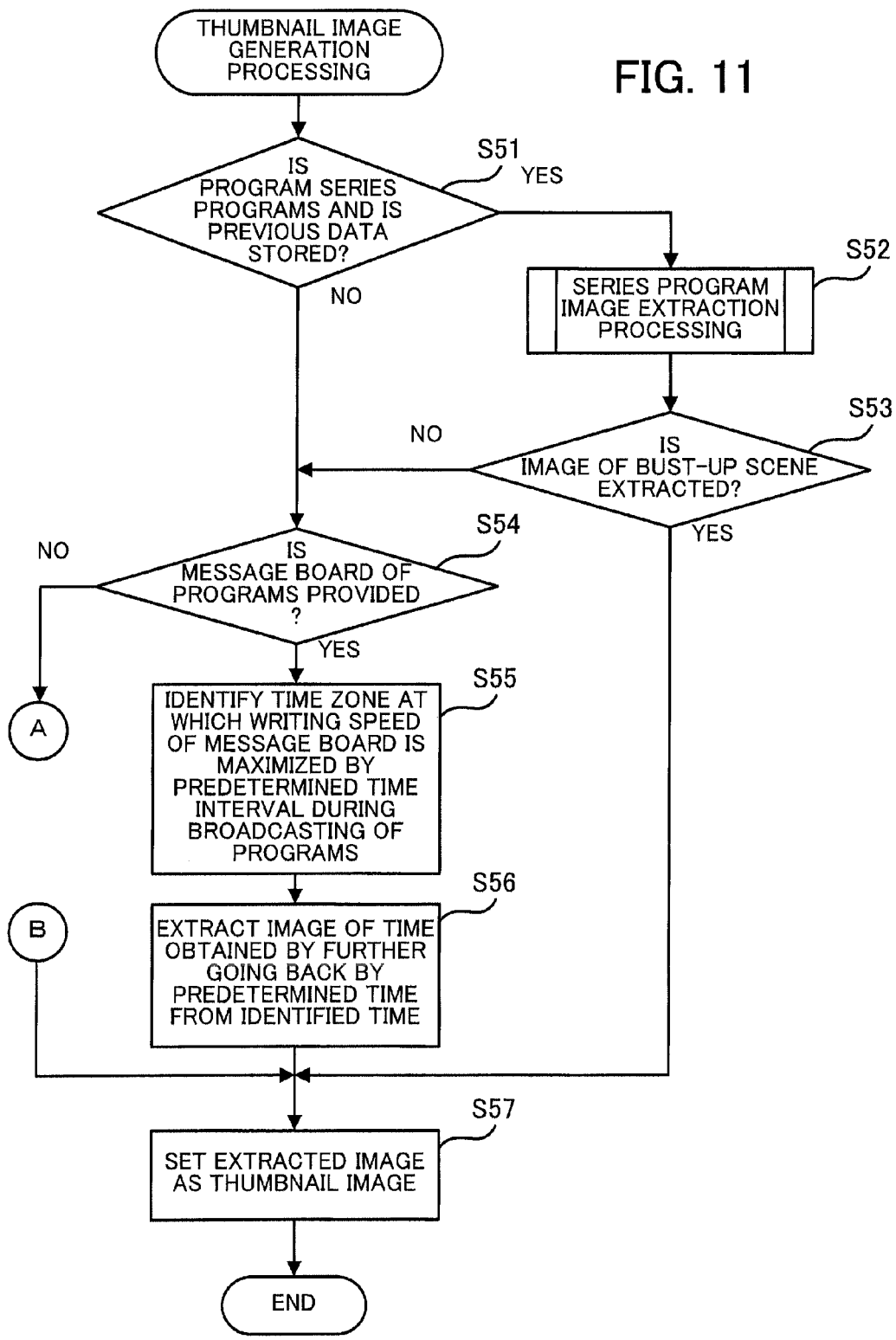
FIG. 11 is a flowchart illustrating a procedure of thumbnail image generation processing according to the third embodiment.
Figure 12:
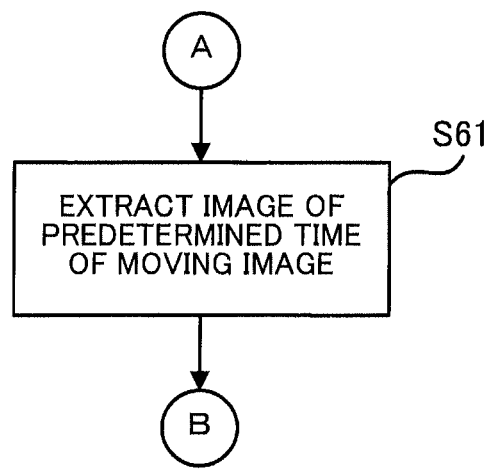
FIG. 12 is a flowchart illustrating a procedure of the thumbnail image generation processing according to the third embodiment.

FIGS. 11 and 12 are a combined flowchart illustrating a procedure of the thumbnail image generation processing according to the third embodiment. In the thumbnail image generation processing illustrated in FIGS. 11 and 12, the moving image processing apparatus 200 (described above in FIG. 10) generates thumbnail images of the TV program based on the moving image data of the TV program. The thumbnail image generation processing is performed, for example, during storing (recording) the TV program.

(Step S51) The thumbnail image generation unit 212 (described above in FIG. 10) determines whether a program for generating a thumbnail image through the thumbnail image generation processing is a series of programs and the moving image data of the previous broadcasting is stored in the program data storage unit 160. If so, the process advances to step S52. On the other hand, if not, the process proceeds to step S54.

(Step S52) The thumbnail image generation unit 212 performs the series program image extraction processing (described above in FIG. 5) in the same manner as in the thumbnail image generation unit 112 according to the second embodiment with respect to the moving image data of the program in which it is determined at step S51 that the moving image data of the previous broadcasting is stored.

(Step S53) The thumbnail image generation unit 212 determines whether an image of a bust-up scene is extracted in the series program image extraction processing of step S52. If so, the process advances to step S57. On the other hand, if not, the process proceeds to step S54.

(Step S54) In an official website of a program in which a thumbnail image is generated, the determination data acquisition unit 211 (described above in FIG. 10) determines whether a message board relating to the program is provided. If so, the process advances to step S55. On the other hand, if not, the process proceeds to step S61 (FIG. 12).

(Step S55) The determination data acquisition unit 211 acquires a writing speed data indicating a transition of the writing speed data of the message board of the program via the Internet 30 (described above in FIG. 10). Based on the acquired writing speed data, the determination data acquisition unit 211 then identifies a time zone at which a writing speed of the message board is maximized by a predetermined time interval (e.g., an interval of 10 seconds).

(Step S56) The thumbnail image generation unit 212 extracts as the high-speed writing image an image of the time obtained by further going back by a predetermined time (e.g., 10 seconds) from the time zone at which the writing speed of the message board identified at step S55 is maximized. Here, for the following reason, the thumbnail image generation unit 212 extracts as the high-speed writing image an image of the time obtained by further going back by a predetermined time from the time zone at which the writing speed is maximized. That is, the reason is considered that a viewer views each scene of a program, writes a posting for it, and as a result a certain level of time lag occurs while a management server of the message board receives the posting. Therefore, the predetermined time is not necessarily limited to 10 seconds and an arbitrary time may be set.

(Step S57) The thumbnail image generation unit 212 sets an image of the TV program extracted at step S52 or S56 as a thumbnail image of the program, and stores thumbnail image data in the thumbnail image data storage unit 150 (described above in FIG. 10). The processing is then finished.

(Step S61) The thumbnail image generation unit 212 extracts an image (an image after the elapse of a predetermined time from the start of a moving image and, for example, an image after the elapse of 60 seconds from the start) at a predetermined time of a moving image of a program in which a thumbnail image is generated. The process then proceeds to step S57 (FIG. 11).

In the case where a moving image is used in a series of programs, the present embodiment extracts a thumbnail image of a bust-up scene from the common section. Specifically, the thumbnail image from the common section and the thumbnail image of the bust-up scene are extracted in preference to the thumbnail image based on the writing speed data. However, the extraction method is not limited thereto, and the thumbnail image based on the writing speed data may be extracted in preference to the other extraction methods. In addition, the thumbnail image of the bust-up scene may be extracted not only from the common section but also from the other section.

When the user extracts a thumbnail image based on the writing speed data, a thumbnail image from the common section, and a thumbnail image from the bust-up scene, respective extraction methods may be independently used, or a part of the extraction methods may be used in combination. The extraction methods may be further used in combination of other extraction methods of thumbnail images. Note that a combination of the extraction methods is not limited to the above-described combination and may be appropriately changed.

As described above, according to the third embodiment, when extracting a thumbnail image based on a writing speed from a viewer for a program during broadcasting, the proposed moving image processing apparatus reflects enthusiastic backing of the viewer in each scene of the program during the broadcasting on the extraction of the thumbnail image.

When an image of a time zone at which the writing speed is a predetermined speed or more is extracted as a thumbnail image, a scene considered that the viewer rises in a program is set as a thumbnail image. Therefore, the viewer easily grasps contents of the program. Further, since there is a high probability that a scene is impressive in a program, these features of the third embodiment permit the user to easily remember contents of a program.

Fourth Embodiment

Next, a fourth embodiment will be described. A difference from the second embodiment will be mainly described. In the fourth embodiment, the same circuit elements as those in the second embodiment are indicated by the same reference numerals as in the second embodiment, and the description will not be repeated here.

The fourth embodiment differs from the second embodiment in the fact that both of the viewing rate data and the writing speed data are used as a criterion of the extraction of a thumbnail image.

Figure 13:
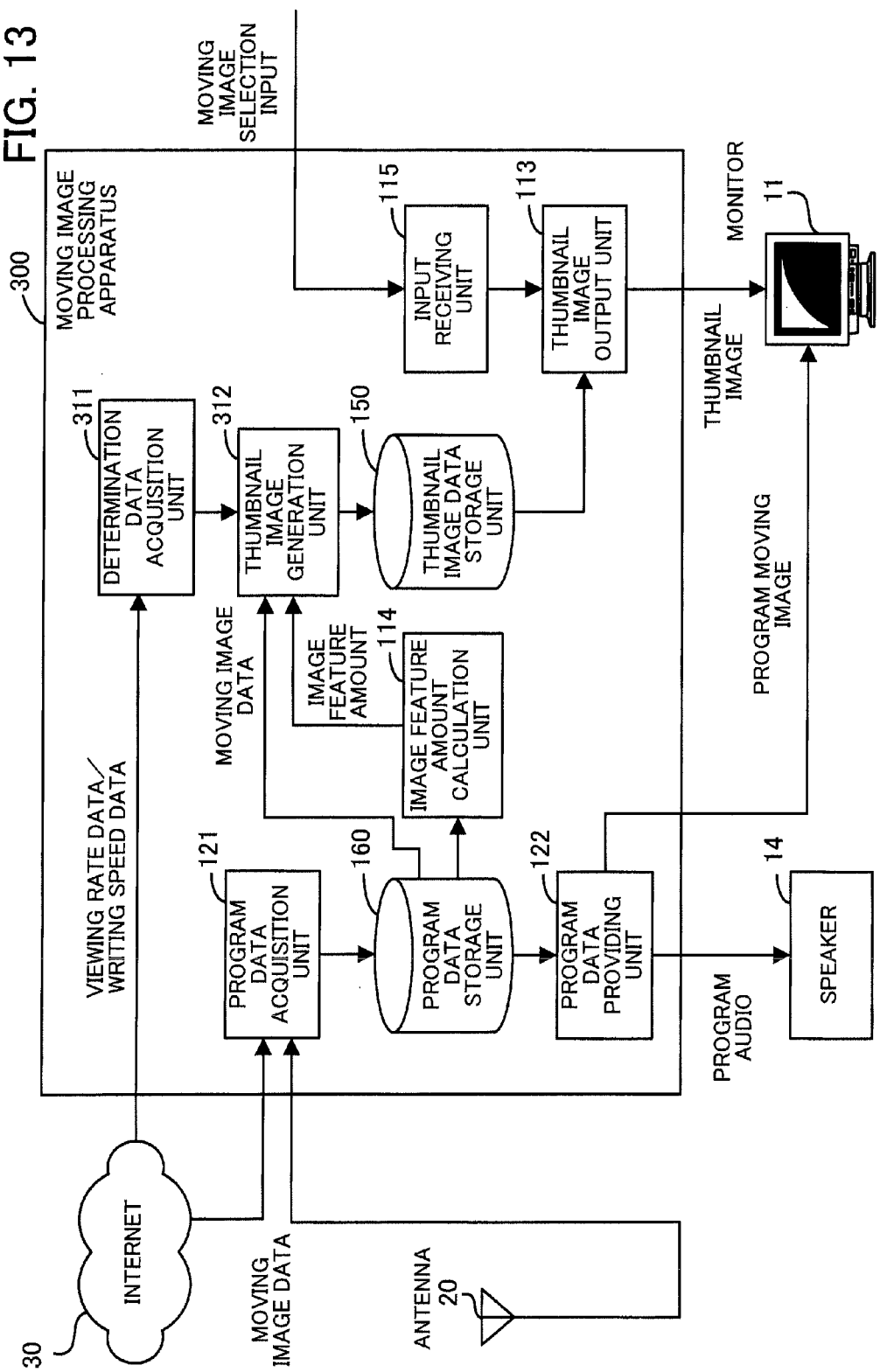
FIG. 13 is a block diagram of a moving image processing apparatus according to a fourth embodiment.

FIG. 13 is a block diagram of a moving image processing apparatus according to the fourth embodiment. The moving image processing apparatus 300 illustrated in FIG. 13 includes a determination data acquisition unit 311, a thumbnail image generation unit 312, the thumbnail image output unit 113, the image feature amount calculation unit 114, the input receiving unit 115, the program data acquisition unit 121, the program data providing unit 122, the thumbnail image data storage unit 150, and the program data storage unit 160. To the thumbnail image output unit 113, the monitor 11 is further connected in the same manner as in the second embodiment. To the program data acquisition unit 121, the antenna 20 and the Internet 30 are further connected in the same manner as in the second embodiment. To the program data providing unit 122, the monitor 11 and the speaker 14 are further connected in the same manner as in the second embodiment.

The determination data acquisition unit 311 acquires viewing rate data and writing speed data as determination data via the Internet 30.

The thumbnail image generation unit 312 acquires moving image data included in the program data stored in the program data storage unit 160.

Next, based on the viewing rate data and writing speed data acquired by the determination data acquisition unit 311, the thumbnail image generation unit 312 extracts thumbnail images from the acquired moving image data. The thumbnail image generation unit 312 permits thumbnail images to be extracted from the moving images of the time at which the viewer identified from the viewing rate data and the writing speed data rises.

At this time, in the case where the moving image data of previous broadcasting is stored in the program data storage unit 160, the thumbnail image generation unit 312 extracts a common section in which an image is the same as or similar to that of the moving image data of the previous broadcasting based on the image feature amount calculated by the image feature amount calculation unit 114. The thumbnail image generation unit 312 further extracts a bust-up image including a character's bust up from the moving image data of the extracted common section, and then generates thumbnail image data by using as a thumbnail image the extracted bust-up image.

In the case where the moving image data of the previous broadcasting is not stored in the program data storage unit 160, the thumbnail image generation unit 312 extracts a bust-up image including a character's bust up from the entire acquired moving image data from the start to the end, and then generates thumbnail image data by using as a thumbnail image the extracted bust-up image.

In the case where a viewing rate is a predetermined threshold or more, the thumbnail image generation unit 312 extracts a highest viewing rate image from the acquired moving image data based on the viewing rate data, and generates thumbnail image data by using as a thumbnail image the extracted highest viewing rate image. The thumbnail image generation unit 312 identifies the time of a high viewing rate based on the viewing rate data, and determines the identified time as the time at which a viewer of the moving images rises. As can be seen from the above discussion, the thumbnail image generation unit 312 permits a thumbnail image to be extracted from the moving images of the time at which the identified viewer rises based on the viewing rate data.

Based on the viewing rate data, the thumbnail image generation unit 312 may extract a viewing rate rapidly-rising image from the acquired moving image data, and then generate thumbnail image data by using as a thumbnail image the extracted viewing rate rapidly-rising image.

Based on the writing speed data, the thumbnail image generation unit 312 extracts a high-speed writing image from the acquired moving image data, and generates thumbnail image data by using as a thumbnail image the extracted high-speed writing image. Based on the writing speed data, the thumbnail image generation unit 312 identifies the time at which the writing speed of a viewer is fast with respect to the message board, and determines the identified time as the time at which the viewer of the moving image rises. As can be seen from the above sequence, the thumbnail image generation unit 312 permits a thumbnail image to be extracted from the moving images of the time at which the viewer identified from the writing speed data rises.

Next, the thumbnail image generation unit 312 stores the generated thumbnail image data in the thumbnail image data storage unit 150.

The thumbnail image output unit 113 outputs the thumbnail image data stored in the thumbnail image data storage unit 150 in the same manner as in the second embodiment.

The image feature amount calculation unit 114 calculates an image feature amount of an image of a frame of the moving image data and that of the previous broadcasting in the same manner as in the second embodiment.

The input receiving unit 115 receives a selection input of moving images of a program to be viewed through the user in the same manner as in the second embodiment.

The program data acquisition unit 121 acquires program data of the TV program available to the user, and stores the acquired program data in the program data storage unit 160 in the same manner as in the second embodiment.

The program data providing unit 122 provides program data selected by the user received by the input receiving unit 115 in the same manner as in the second embodiment.

The thumbnail image data storage unit 150 stores the thumbnail image data indicating a thumbnail image of the moving image data in the same manner as in the second embodiment.

The program data storage unit 160 stores program data of the previously-broadcast TV program acquired by the program data acquisition unit 121 in the same manner as in the second embodiment.

Figure 14:
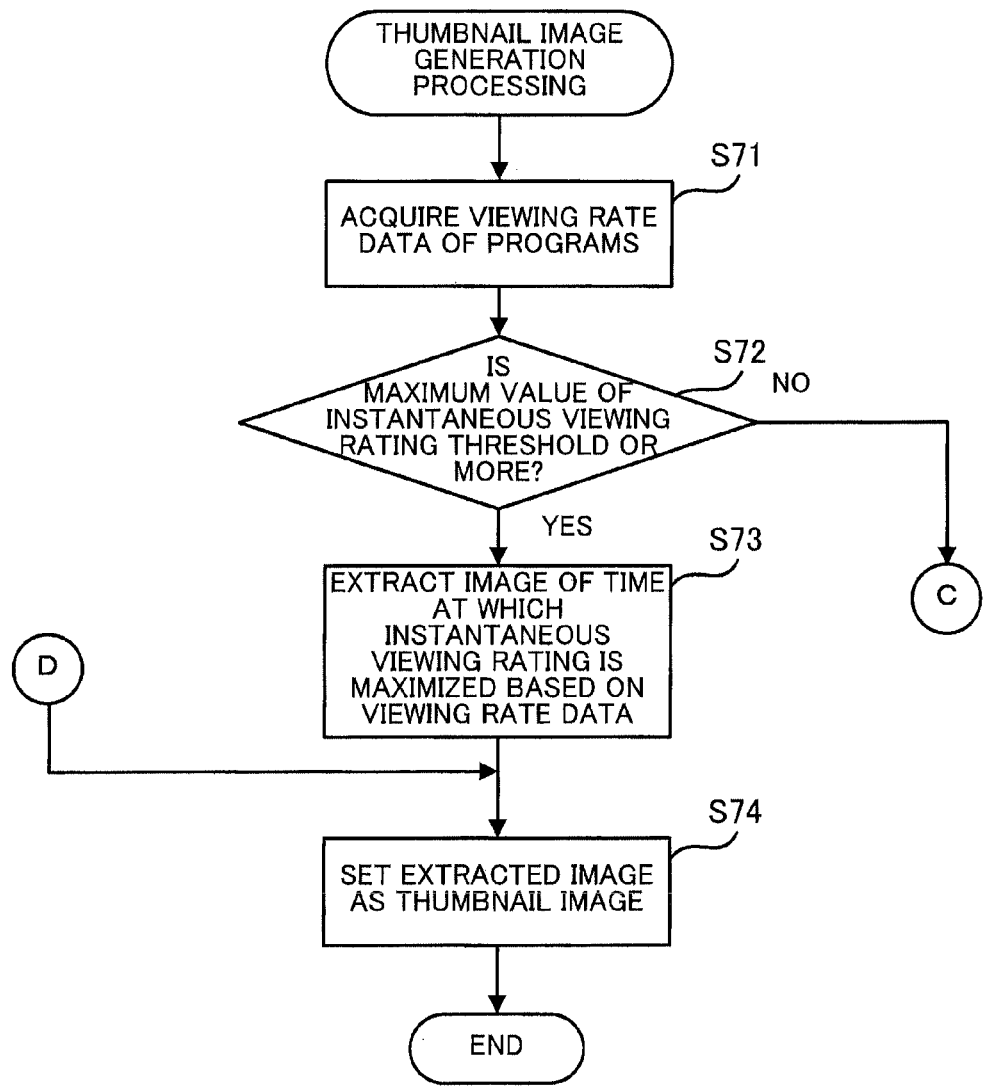
FIG. 14 is a flowchart illustrating a procedure of thumbnail image generation processing according to the fourth embodiment.
Figure 15:
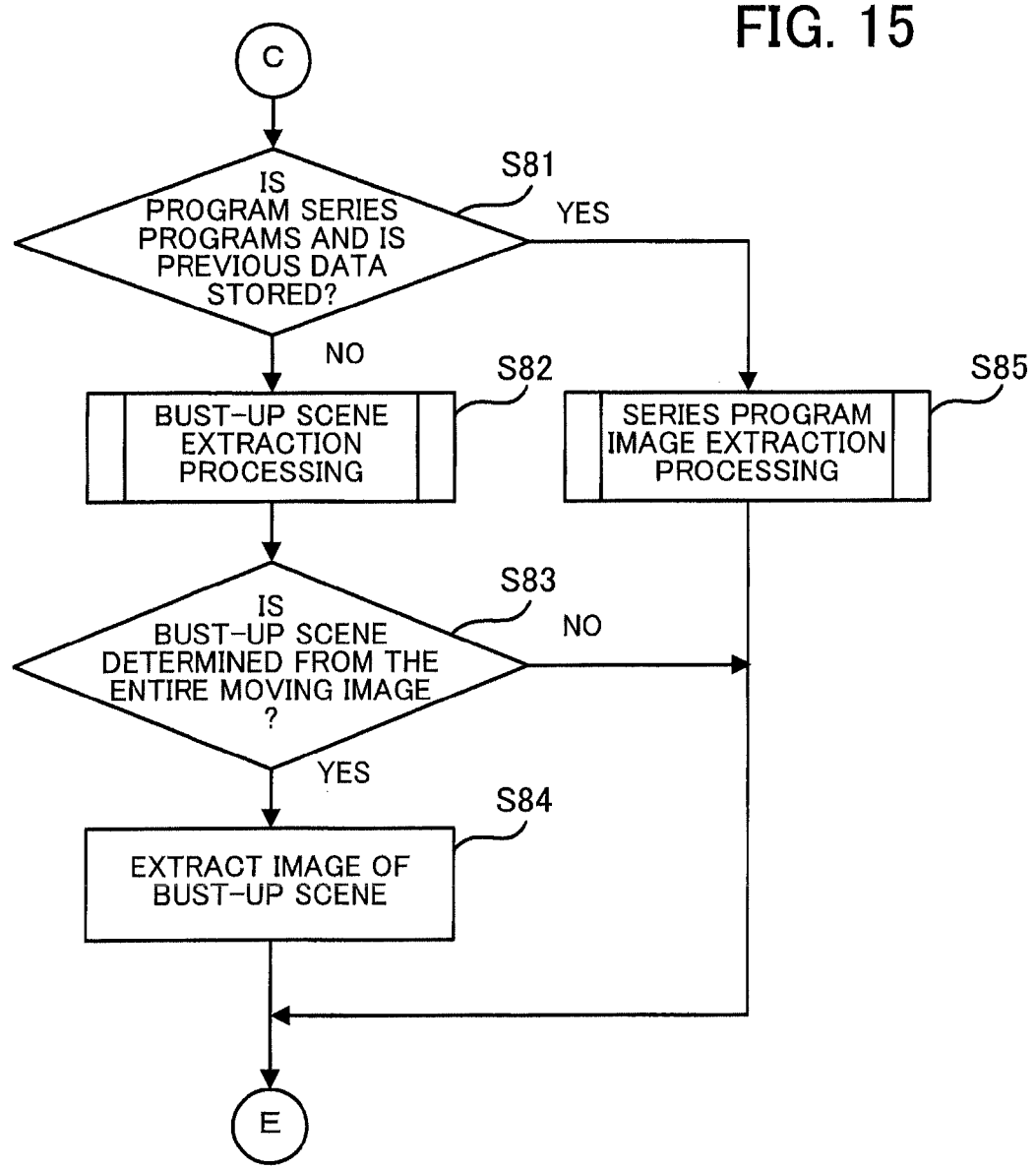
FIG. 15 is a flowchart illustrating a procedure of the thumbnail image generation processing according to the fourth embodiment.

FIGS. 14 to 16 are a combined flowchart illustrating a procedure of the thumbnail image generation processing according to the fourth embodiment. In the thumbnail image generation processing illustrated in FIGS. 14 to 16, the moving image processing apparatus 300 (described above in FIG. 13) generates thumbnail images of the TV program based on the moving image data of the TV program. The thumbnail image generation processing is performed, for example, during storing (recording) the TV program.

(Step S71) The determination data acquisition unit 311 (described above in FIG. 13) acquires viewing rate data indicating a transition of a viewing rate of the program via the Internet 30 (described above in FIG. 13).

(Step S72) Based on the viewing rate data acquired at step S71, the thumbnail image generation unit 312 (described above in FIG. 13) determines whether a maximum value of an instantaneous viewing rating of the program is a predetermined threshold or more. If so, the process advances to step S73. On the other hand, if not, the process proceeds to step S81 (FIG. 15).

(Step S73) From the moving image data of the programs, based on the viewing rate data acquired at step S71, the thumbnail image generation unit 312 extracts as a highest viewing rate image an image of the time at which an instantaneous viewing rating is maximized during the broadcast of the program.

(Step S74) The thumbnail image generation unit 312 sets an image of the TV program extracted at step S73, S84 (FIG. 15), S85 (FIG. 15), S94 (FIG. 16), or S95 (FIG. 16) as a thumbnail image of the program, and stores the thumbnail image data in the thumbnail image data storage unit 150 (described above in FIG. 13). The process is then finished.

(Step S81) The thumbnail image generation unit 312 determines whether a program in which a thumbnail image is generated through the thumbnail image generation processing is a series of programs and the moving image data of the previous broadcasting is stored in the program data storage unit 160. If so, the process advances to step S85. On the other hand, if not, the process proceeds to step S82.

(Step S82) The thumbnail image generation unit 312 performs the bust-up scene extraction processing (described above in FIG. 8) with respect to the entire moving image data of a program in which a thumbnail image is generated.

(Step S83) The thumbnail image generation unit 312 determines whether the bust-up scene is determined from the entire moving image data of the program at step S82. If so, the process advances to step S84. On the other hand, if not, the process proceeds to step S91 (FIG. 16).

(Step S84) The thumbnail image generation unit 312 extracts an image of the bust-up scene determined at step S83. The process then proceeds to step S91.

(Step S85) The thumbnail image generation unit 312 performs the series program image extraction processing (described above in FIG. 5) with respect to the moving image data of the program in which it is determined at step S81 that the moving image data of the previous broadcasting is stored. The process then proceeds to step S91.

(Step S91) The thumbnail image generation unit 312 determines whether an image of the bust-up scene is extracted in the processing from steps S82 to S84 (all steps are illustrated in FIG. 15) or in the series program image extraction processing of step S85 (FIG. 15). If so, the process advances to step S74 (FIG. 14). On the other hand, if not, the process proceeds to step S92.

(Step S92) In an official website of a program in which a thumbnail image is generated, the determination data acquisition unit 311 determines whether a message board relating to the program is provided. If so, the process advances to step S93. On the other hand, if not, the process proceeds to step S95.

(Step S93) The determination data acquisition unit 311 acquires a writing speed data indicating a transition of a writing speed of the message board of the program via the Internet 30. Based on the acquired writing speed data, the determination data acquisition unit 311 identifies a time zone at which the writing speed of the message board is maximized, by a predetermined time interval (e.g., an interval of 10 seconds).

(Step S94) The thumbnail image generation unit 312 extracts as the high-speed writing image an image of the time obtained by further going back by a predetermined time (e.g., 10 seconds) from the time zone at which the writing speed of the message board identified at step S93 is maximized. The process then proceeds to step S74.

(Step S95) The thumbnail image generation unit 312 extracts an image after the elapse of a predetermined time (e.g., after the elapse of 60 seconds from the start) in the moving image of a program in which a thumbnail image is generated. The process then proceeds to step S74.

In the present embodiment, in the case where a maximum value of a viewing rate of the moving image is a threshold or more, an image of the time at which an instantaneous viewing rating is maximized is extracted as a thumbnail image based on the viewing rate data. Specifically, the thumbnail image based on the viewing rate data is extracted in preference to the thumbnail image based on the writing speed data and the thumbnail image of the bust-up scene. However, the extraction method is not limited thereto, and the thumbnail image based on the writing speed data may be extracted in preference to the other extraction methods. Further, the thumbnail image of the bust-up scene may be extracted in preference to the other extraction methods, and the thumbnail image from the common section may be extracted in preference to the other extraction methods.

Further, in the extraction of a thumbnail image based on the viewing rate data, that based on the writing speed data, that from the common section, and that from the bust-up scene, respective extraction methods may be individually used, or a part of the extraction methods may be used in combination. The extraction methods may be further used in combination of other extraction methods of thumbnail images. The combination of the extraction methods and criterion of the priority are not limited to the above-described combinations, and may be appropriately changed.

As described above, according to the fourth embodiment, in the case where the maximum value of the viewing rate is a threshold or more, when a thumbnail image is extracted based on the viewing rate of the program, the proposed moving image processing apparatus reflects the presence or absence of the enthusiastic backing of a viewer on the extraction of the thumbnail image.

The above-described processing functions are implemented by a computer. In this case, a program is provided which describes the processing content of functions to be provided in the moving image processing apparatus 100, 200, and 300. The processing functions are implemented on the computer by executing the program on the computer.

The program which describes the processing content is recorded in a computer readable recording medium. The computer readable recording medium includes a magnetic recording device, an optical disk, an optical magnetic recording medium, and a semiconductor memory. The magnetic recording device includes an HDD, an FD (Flexible Disk), and an MT (Magnetic Tape). The optical disk includes a DVD, a DVD-RAM, a CD-ROM (Read Only Memory), and a CD-R (Recordable)/RW (ReWritable). The optical magnetic recording medium includes an MO (Magneto-Optical disk).

In order to distribute the program, a portable recording medium such as a DVD and CD-ROM having recorded thereon the program is sold. Also, the program may be stored in a storage device of a server computer to enable the program to be transferred from the server computer via a network to another computer.

The computer, which executes the program, stores in its own storage device, for example, the program recorded in a portable recording medium or the program transferred from the server computer. Then, the computer reads the program from its own storage device and executes processing based on the program. Here, the computer may also read the program directly from the portable recording medium to execute the processing based on the program; or alternatively, each time the program is transferred from the server computer, the computer may execute processing based on the received program in series.

As can be seen from various embodiments discussed above, when a thumbnail image in which contents of a moving image are appropriately indicated is generated, the proposed moving image processing apparatus, thumbnail image generation program, and thumbnail image generation method easily evoke contents of the moving image for a user and support determination whether the user views the moving image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A moving image processing apparatus comprising:
a memory configured to store moving image data; and
one or more processors configured to perform a procedure including:
acquiring data indicating how a viewing rate of a broadcast program varies with a time during a broadcast time of the broadcast program in which the moving image data is broadcast;
extracting an image out of the moving image data in the memory based on the data acquired;
producing a thumbnail image from the extracted image, generating thumbnail image data indicating the produced thumbnail image,
outputting the generated thumbnail image data, and
wherein indicating a relationship between each time during the broadcast time of the broadcast program and a writing speed of a posting of a viewer relating to the broadcast program is acquired; and
a time point in the broadcast time the writing speed reaches a maximum is determined based on the acquired data of the writing speed, and an image at the determined time point, out of the moving image data in the memory is extracted.

2. The moving image processing apparatus according to claim 1, comprising:
determining, based on the acquired data of the viewing rate, a time point in the broadcast time the viewing rate reaches a maximum, and extracting an image at the determined time point, out of the moving image data in the memory.

3. The moving image processing apparatus according to claim 2, wherein:
the extracting of an image at the determined time point is performed when the maximum of the viewing rate is equal to or greater than a predetermined threshold.

4. The moving image processing apparatus according to claim 1, wherein:
the determining based on the acquired data of the writing speed includes determining a time zone at which the writing speed is a predetermined speed or more.

5. The moving image processing apparatus according to claim 1, comprising:
determining, based on the viewing rate, a time point in the broadcast time the viewing rate rises with a slope that is equal to or greater than a predetermined per-unit-time slope, and
extracting an image at the determined time point, out of the moving image data in the memory.

6. A non-transitory computer-readable medium encoded with a computer program for generating a thumbnail image, the computer program causing a computer to perform a procedure comprising:

acquiring data indicating how a viewing rate of a broadcast program varies with time during a broadcast time of the broadcast program in which moving image data is broadcast;

extracting an image out of the moving image data based on the data acquired;

producing a thumbnail image from the extracted image;

generating thumbnail image data indicating the produced thumbnail image; and outputting the generated thumbnail image data, and wherein indicating a relationship between each time during the broadcast time of the broadcast program and a writing speed of a posting of a viewer relating to the broadcast program is acquired; and a time point in the broadcast time the writing speed reaches a maximum is determined based on the acquired data of the writing speed, and an image at the determined time point, out of the moving image data is extracted.

7. The non-transitory computer-readable medium according to claim 6, comprising:

determining, based on the acquired data of the viewing rate, a time point in the broadcast time the viewing rate reaches a maximum, and extracting an image at the determined time point, out of the moving image data.

8. A thumbnail image generation method executed by a computer, the method comprising:

acquiring data indicating how a viewing rate of a broadcast program varies with time during a broadcast time of the broadcast program in which moving image data is broadcast;

extracting an image out of the moving image data based on the data acquired;

producing a thumbnail image from the extracted image;

generating thumbnail image data indicating the produced thumbnail image; and outputting the generated thumbnail image data, and wherein indicating a relationship between each time during the broadcast time of the broadcast program and a writing speed of a posting of a viewer relating to the broadcast program is acquired; and a time point in the broadcast time the writing speed reaches a maximum is determined based on the acquired data of the writing speed, and an image at the determined time point, out of the moving image data in the memory is extracted.

9. The method according to claim 8, comprising:

determining, based on the acquired data of the viewing rate, a time point in the broadcast time the viewing rate reaches a maximum, and extracting an image at the determined time point, out of the moving image data.

10. The method according to claim 8, wherein the extracting of the image extracts a viewing rate rapidly-rising image that is an image associated with a time at which the viewing rate rapidly rises, from the moving image data based on the acquired data indicating how the viewing rate of the broadcast program varies; and the generating of the thumbnail image data uses the extracted viewing rate rapidly-rising image as the thumbnail image.

* * * * *

UNITED STATES PATENT AND TRADEMARK OFFICE
CERTIFICATE OF CORRECTION

PATENT NO. : 8,798,437 B2
APPLICATION NO. : 13/356217
DATED : August 5, 2014
INVENTOR(S) : Takashi Teraskai It is certified that error appears in the above-identified patent and that said Letters Patent is hereby corrected as shown below:

In the Claims

Column 20, Line 30, In Claim 1, delete "wherein" and insert -- wherein data --, therefor.

Column 21, Line 11, In Claim 6, delete "wherein" and insert -- wherein data --, therefor.

Column 22, Line 7, In Claim 8, delete "wherein" and insert -- wherein data --, therefor.

Signed and Sealed this
Fourth Day of November, 2014

Michelle K. Lee
*Deputy Director of the United States Patent and Trademark Office*